US012812575B2

(12) United States Patent
Shellhammer et al.

(10) Patent No.: US 12,812,575 B2
(45) Date of Patent: Nov. 24, 2026

(54) AMBIENT POWER RESYNCHRONIZATION FIELD

(71) Applicant: QUALCOMM Incorporated, San Diego, CA (US)

(72) Inventors: Stephen Jay Shellhammer, Ramona, CA (US); Pooria Pakrooh, San Marcos, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 18/809,086

(22) Filed: Aug. 19, 2024

(65) Prior Publication Data

US 2025/0193813 A1 Jun. 12, 2025

Related U.S. Application Data

(60) Provisional application No. 63/607,325, filed on Dec. 7, 2023.

(51) Int. Cl.
*H04W 56/00* (2009.01)
*H04L 5/00* (2006.01)

(52) U.S. Cl.
CPC ....... *H04W 56/0015* (2013.01); *H04L 5/0055* (2013.01); *H04W 56/005* (2013.01)

(58) Field of Classification Search
None
See application file for complete search history.

(56) References Cited

U.S. PATENT DOCUMENTS

2004/0218683 A1* 11/2004 Batra .................. H04L 27/0008 375/222
2018/0336160 A1* 11/2018 Fukumoto ........... G06F 13/4068
2022/0263700 A1* 8/2022 Dabbs ................. H04L 27/2655

* cited by examiner

*Primary Examiner* — Anh Ngoc M Nguyen
(74) *Attorney, Agent, or Firm* — Holland & Hart LLP

(57) ABSTRACT

This disclosure provides methods, components, devices and systems for ambient power resynchronization field. Some aspects more specifically relate to the use of one or more resynchronization fields that may be used to periodically resynchronize or adjust symbol timing alignment at an ambient wireless device. For example, some ambient wireless devices may experience poor clock accuracy for communications due to their low cost and complexity. To support enhanced timing accuracy and to reduce clock drift for a communicated data packet, the ambient wireless device may use a resynchronization field within the data field of a data packet to perform ongoing timing resynchronization and symbol timing alignment during the resynchronization field. One or more resynchronization fields may be included in the data field of the data packet after every "N" octets of data, so that the ambient wireless device may perform periodic clock resynchronization.

30 Claims, 10 Drawing Sheets

AMBIENT POWER RESYNCHRONIZATION FIELD

CROSS REFERENCE

The present application for patent claims the benefit of U.S. Provisional Patent Application No. 63/607,325 by SHELLHAMMER et al., entitled "AMBIENT POWER RESYNCHRONIZATION FIELD," filed Dec. 7, 2023, assigned to the assignee hereof, and expressly incorporated by reference in its entirety herein.

TECHNICAL FIELD

This disclosure relates generally to wireless communication and, more specifically, to an ambient power resynchronization field.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, an ambient power (AMP) deployment may be supported. For example, one or more energy harvesting devices (such as ambient wireless devices or ambient tags) may lack an internal power source or may otherwise have limited energy storage capabilities. Such devices may alternatively, or additionally, perform energy harvesting from one or more energy sources to communicate data with a reader device.

SUMMARY

The systems, methods, and devices of this disclosure each have several innovative aspects, no single one of which is solely responsible for the desirable attributes disclosed herein.

One innovative aspect of the subject matter described in this disclosure can be implemented in an ambient wireless device for wireless communications. The ambient wireless device may include a processing system that includes processor circuitry and memory circuitry that stores code. The processing system may be configured to cause the ambient wireless device to receive, from a reader device, a wake-up signal indicating a data packet available for communication with the ambient wireless device, perform a first clock synchronization using a synchronization field of the data packet, communicate, based on the first clock synchronization, a first set of data bits via a first portion of a data field of the data packet, perform a first clock resynchronization using a first resynchronization field of the data packet to adjust a symbol timing alignment for communication with the ambient wireless device, where the first resynchronization field occurs subsequent to the first portion of the data field, and communicate, based on the symbol timing alignment of the first clock resynchronization, a second set of data bits via a second portion of the data field.

Another innovative aspect of the subject matter described in the disclosure can be implemented in a method for wireless communications by an ambient wireless device. The method may include receiving, from a reader device, a wake-up signal indicating a data packet available for communication with the ambient wireless device, performing a first clock synchronization using a synchronization field of the data packet, communicating, based on the first clock synchronization, a first set of data bits via a first portion of a data field of the data packet, performing a first clock resynchronization using a first resynchronization field of the data packet to adjust a symbol timing alignment for communication with the ambient wireless device, where the first resynchronization field occurs subsequent to the first portion of the data field, and communicating, based on the symbol timing alignment of the first clock resynchronization, a second set of data bits via a second portion of the data field.

Another innovative aspect of the subject matter described in the disclosure can be implemented in another ambient wireless device for wireless communications. The ambient wireless device may include means for receiving, from a reader device, a wake-up signal indicating a data packet available for communication with the ambient wireless device, means for performing a first clock synchronization using a synchronization field of the data packet, means for communicating, based on the first clock synchronization, a first set of data bits via a first portion of a data field of the data packet, means for performing a first clock resynchronization using a first resynchronization field of the data packet to adjust a symbol timing alignment for communication with the ambient wireless device, where the first resynchronization field occurs subsequent to the first portion of the data field, and means for communicating, based on the symbol timing alignment of the first clock resynchronization, a second set of data bits via a second portion of the data field.

Another innovative aspect of the subject matter described in the disclosure can be implemented in a non-transitory computer-readable medium storing code for wireless communications at an ambient wireless device. The code may include instructions executable by one or more processors to receive, from a reader device, a wake-up signal indicating a data packet available for communication with the ambient wireless device, perform a first clock synchronization using a synchronization field of the data packet, communicate, based on the first clock synchronization, a first set of data bits via a first portion of a data field of the data packet, perform a first clock resynchronization using a first resynchronization field of the data packet to adjust a symbol timing alignment for communication with the ambient wireless device, where the first resynchronization field occurs subsequent to the first portion of the data field, and communicate, based on the symbol timing alignment of the first clock resynchronization, a second set of data bits via a second portion of the data field.

Some examples of the method, ambient wireless devices, and non-transitory computer-readable medium described herein may further include operations, features, means, or instructions for communicating, based on the first clock resynchronization, one or more additional sets of data bits via one or more additional portions of the data field and performing one or more additional clock resynchronizations using one or more additional resynchronization fields of the data packet subsequent to the second portion of the data field.

Some examples of the method, ambient wireless devices, and non-transitory computer-readable medium described herein may further include operations, features, means, or instructions for performing a second clock resynchronization using a second resynchronization field occurring subsequent to the second portion of the data field, where the first resynchronization field and the second resynchronization field may be separated by a quantity of data bits associated with a resynchronization field periodicity.

In some examples of the method, ambient wireless devices, and non-transitory computer-readable medium described herein, the quantity of data bits associated with the resynchronization field periodicity may be based on a data rate of the data packet.

In some examples of the method, ambient wireless devices, and non-transitory computer-readable medium described herein, the quantity of data bits associated with the resynchronization field periodicity include one or more data octets.

In some examples of the method, ambient wireless devices, and non-transitory computer-readable medium described herein, the first resynchronization field includes a sequence of bits that may be selected based on one or more autocorrelation properties of the sequence of bits.

Another innovative aspect of the subject matter described in this disclosure can be implemented in a reader device for wireless communications. The reader device may include a processing system that includes processor circuitry and memory circuitry that stores code. The processing system may be configured to cause the reader device to transmit, to an ambient communication device, a wake-up signal indicating a data packet available for communication with the ambient communication device, communicate a first set of data bits via a first portion of a data field of the data packet with the ambient communication device, communicate a first resynchronization field of the data packet for adjusting a symbol timing alignment of the ambient communication device, where the first resynchronization field occurs subsequent to the first portion of the data field, and communicate, based on the communication of the first resynchronization field, a second set of data bits via a second portion of the data field.

Another innovative aspect of the subject matter described in this disclosure can be implemented in a method for wireless communications by a reader device. The method may include transmitting, to an ambient communication device, a wake-up signal indicating a data packet available for communication with the ambient communication device, communicating a first set of data bits via a first portion of a data field of the data packet with the ambient communication device, communicating a first resynchronization field of the data packet for adjusting a symbol timing alignment of the ambient communication device, where the first resynchronization field occurs subsequent to the first portion of the data field, and communicating, based on the communication of the first resynchronization field, a second set of data bits via a second portion of the data field.

Another innovative aspect of the subject matter described in this disclosure can be implemented in another reader device for wireless communications. The reader device may include means for transmitting, to an ambient communication device, a wake-up signal indicating a data packet available for communication with the ambient communication device, means for communicating a first set of data bits via a first portion of a data field of the data packet with the ambient communication device, means for communicating a first resynchronization field of the data packet for adjusting a symbol timing alignment of the ambient communication device, where the first resynchronization field occurs subsequent to the first portion of the data field, and means for communicating, based on the communication of the first resynchronization field, a second set of data bits via a second portion of the data field.

Another innovative aspect of the subject matter described in this disclosure can be implemented in a non-transitory computer-readable medium storing code for wireless communications at a reader device is described. The code may include instructions executable by one or more processors to transmit, to an ambient communication device, a wake-up signal indicating a data packet available for communication with the ambient communication device, communicate a first set of data bits via a first portion of a data field of the data packet with the ambient communication device, communicate a first resynchronization field of the data packet for adjusting a symbol timing alignment of the ambient communication device, where the first resynchronization field occurs subsequent to the first portion of the data field, and communicate, based on the communication of the first resynchronization field, a second set of data bits via a second portion of the data field.

Some examples of the method, reader devices, and non-transitory computer-readable medium described herein may further include operations, features, means, or instructions for communicating, based on the communication of the second set of data bits, one or more additional sets of data bits via one or more additional portions of the data field and communicating one or more additional resynchronization fields of the data packet subsequent to the second portion of the data field for adjusting the symbol timing alignment of the ambient communication device.

Some examples of the method, reader devices, and non-transitory computer-readable medium described herein may further include operations, features, means, or instructions for communicating a second resynchronization field occurring subsequent to the second portion of the data field, where the first resynchronization field and the second resynchronization field may be separated by a quantity of data bits associated with a resynchronization field periodicity.

In some examples of the method, reader devices, and non-transitory computer-readable medium described herein, the quantity of data bits associated with the resynchronization field periodicity may be based on a data rate of the data packet.

In some examples of the method, reader devices, and non-transitory computer-readable medium described herein, the quantity of data bits associated with the resynchronization field periodicity include one or more data octets.

In some examples of the method, reader devices, and non-transitory computer-readable medium described herein, the first resynchronization field includes a sequence of bits that may be selected based on one or more autocorrelation properties of the sequence of bits.

Another innovative aspect of the subject matter described in this disclosure can be implemented in an ambient wireless device for wireless communications. The ambient wireless device may include a processing system that includes processor circuitry and memory circuitry that stores code. The processing system may be configured to cause the ambient wireless device to transmit, to a reader device, an uplink signal indicating a data packet available for communication with the reader device, transmit a first set of data bits via a first portion of a data field of the data packet with the reader device, communicate a first resynchronization field of the data packet for adjusting a symbol timing alignment of the reader device, where the first resynchronization field occurs subsequent to the first portion of the data field, and communicate, based on the communication of the first resynchronization field, a second set of data bits via a second portion of the data field.

Another innovative aspect of the subject matter described in the disclosure can be implemented in a method for wireless communications by an ambient wireless device. The method may include transmitting, to a reader device, an uplink signal indicating a data packet available for communication with the reader device, transmitting a first set of data bits via a first portion of a data field of the data packet with the reader device, communicating a first resynchronization field of the data packet for adjusting a symbol timing alignment of the reader device, where the first resynchronization field occurs subsequent to the first portion of the data field, and communicating, based on the communication of the first resynchronization field, a second set of data bits via a second portion of the data field Another innovative aspect of the subject matter described in the disclosure can be implemented in another ambient wireless device for wireless communications. The ambient wireless device may include means for transmitting, to a reader device, an uplink signal indicating a data packet available for communication with the reader device, means for transmitting a first set of data bits via a first portion of a data field of the data packet with the reader device, means for communicating a first resynchronization field of the data packet for adjusting a symbol timing alignment of the reader device, where the first resynchronization field occurs subsequent to the first portion of the data field, and means for communicating, based on the communication of the first resynchronization field, a second set of data bits via a second portion of the data field Another innovative aspect of the subject matter described in the disclosure can be implemented in a non-transitory computer-readable medium storing code for wireless communications at an ambient wireless device. The code may include instructions executable by one or more processors to transmit, to a reader device, an uplink signal indicating a data packet available for communication with the reader device, transmit a first set of data bits via a first portion of a data field of the data packet with the reader device, communicate a first resynchronization field of the data packet for adjusting a symbol timing alignment of the reader device, where the first resynchronization field occurs subsequent to the first portion of the data field, and communicate, based on the communication of the first resynchronization field, a second set of data bits via a second portion of the data field.

Another innovative aspect of the subject matter described in this disclosure can be implemented in a reader device for wireless communications. The reader device may include a processing system that includes processor circuitry and memory circuitry that stores code. The processing system may be configured to cause the reader device to receive, from an ambient wireless device, an uplink signal indicating a data packet available for communication with the reader device, obtain, based a first clock synchronization, a first set of data bits via a first portion of a data field of the data packet, perform a first clock resynchronization using a first resynchronization field of the data packet to adjust a symbol timing alignment for communication with the ambient wireless device, where the first resynchronization field occurs subsequent to the first portion of the data field, and obtain, based at least in part on the symbol timing alignment of the first clock resynchronization, a second set of data bits via a second portion of the data field.

Another innovative aspect of the subject matter described in this disclosure can be implemented in a method for wireless communications by a reader device. The method may include receiving, from an ambient wireless device, an uplink signal indicating a data packet available for communication with the reader device, obtaining, based a first clock synchronization, a first set of data bits via a first portion of a data field of the data packet, performing a first clock resynchronization using a first resynchronization field of the data packet to adjust a symbol timing alignment for communication with the ambient wireless device, where the first resynchronization field occurs subsequent to the first portion of the data field, and obtaining, based at least in part on the symbol timing alignment of the first clock resynchronization, a second set of data bits via a second portion of the data field.

Another innovative aspect of the subject matter described in this disclosure can be implemented in another reader device for wireless communications. The reader device may include means for receiving, from an ambient wireless device, an uplink signal indicating a data packet available for communication with the reader device, means for obtaining, based a first clock synchronization, a first set of data bits via a first portion of a data field of the data packet, means for performing a first clock resynchronization using a first resynchronization field of the data packet to adjust a symbol timing alignment for communication with the ambient wireless device, where the first resynchronization field occurs subsequent to the first portion of the data field, and means for obtaining, based at least in part on the symbol timing alignment of the first clock resynchronization, a second set of data bits via a second portion of the data field.

Another innovative aspect of the subject matter described in this disclosure can be implemented in a non-transitory computer-readable medium storing code for wireless communications at a reader device is described. The code may include instructions executable by one or more processors to receive, from an ambient wireless device, an uplink signal indicating a data packet available for communication with the reader device, obtain, based a first clock synchronization, a first set of data bits via a first portion of a data field of the data packet, perform a first clock resynchronization using a first resynchronization field of the data packet to adjust a symbol timing alignment for communication with the ambient wireless device, where the first resynchronization field occurs subsequent to the first portion of the data field, and obtain, based at least in part on the symbol timing alignment of the first clock resynchronization, a second set of data bits via a second portion of the data field.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
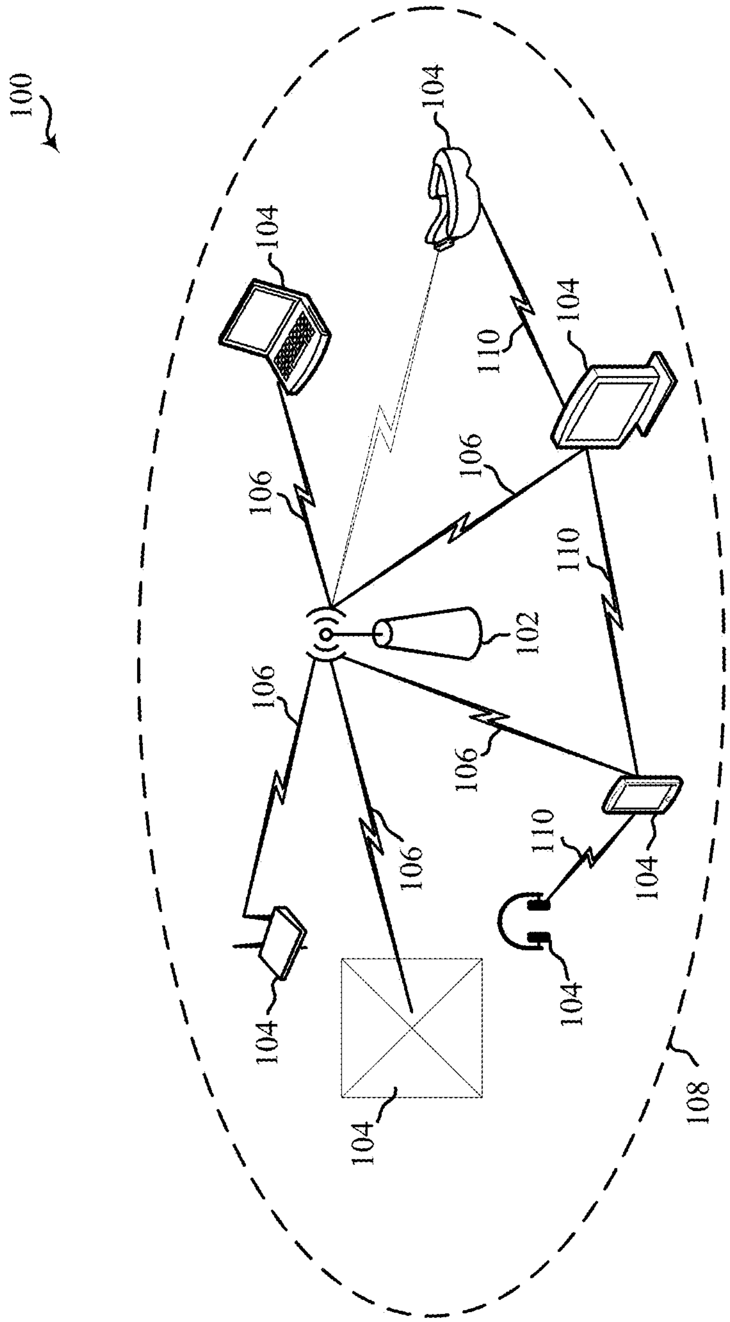
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to an ambient power (AMP) deployment. Some aspects more specifically relate to use of one or more resynchronization fields (e.g., one or more "resync" fields) included within a data packet that may be used to periodically adjust (e.g., resynchronize) symbol timing alignment associated with communication to and/or from an ambient wireless device. AMP-enabled communications may allow ambient wireless devices that lack an internal power supply to harvest energy from a variety of sources including radio waves, light (sunlight), motion, heat, among other ambient power sources. Such ambient wireless devices, however, may experience poor clock accuracy for uplink and/or downlink communications due to their lower cost and complexity relative to other wireless devices equipped with an internal power source. This poor clock accuracy, however, may cause ambient wireless devices to experience large sample clock offset and clock drift as well as large carrier frequency offset over the period of a communicated data packet (among other challenges), which may lead to adverse impact on device timing accuracy and synchronization. These clock synchronization challenges for ambient wireless devices may be especially apparent over a duration for relatively large data packets (for example, packets with long physical layer (PHY) protocol data unit (PPDU) duration).

To support timing accuracy and to reduce clock drift over the duration of a data packet, an ambient wireless device may support use of a resynchronization field within a field, such as a data field, of a data packet, which allows the ambient wireless device (or a reader device) to perform timing resynchronization (e.g., ongoing timing resynchronization) and symbol timing alignment associated with the resynchronization field. For example, one or more resynchronization fields may be included in the data field of a PPDU after some quantity of octets of data (e.g., every "N" octets of data), so that the ambient wireless device (or the reader device) may perform periodic clock resynchronization. In some examples, the number of resynchronization fields included in the data packet may be determined based on whether a low data rate or high data rate is being used for communication of the data packet. In some examples, the resynchronization field may be a sequence of bits that is selected based on one or more characteristic sequence properties, such as strong autocorrelation properties and limited consecutive zeroes in the sequence, among other examples.

Particular aspects of the subject matter described in this disclosure can be implemented to realize one or more of the following potential advantages. In some examples, by implementing one or more resynchronization fields, the described techniques can be used to increase the timing synchronization over a communicated data packet while maintaining low cost and low complexity of the ambient wireless devices. For example, the one or more resynchronization fields may increase clock accuracy between an ambient wireless device and a reader device, which may allow the ambient wireless device to communicate uplink and/or downlink data more accurately with the reader device. Such described techniques may further result in increased reliability for wireless communications, where the timing may be periodically aligned between the ambient wireless device and the reader device during resynchronization fields, allowing for synchronized and more effective communications. Additionally or alternatively, the described techniques may allow for ambient wireless devices to maintain low complexity and low cost while maintaining accurate and reliable communication.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bd, 802.11be, 802.11bf, 802.11bn, and 802.11 bp). In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core.

The wireless communication network 100 may include numerous wireless communication devices including at least one wireless access point (AP) 102 and any number of wireless stations (STAs) 104. While only one AP 102 is shown in FIG. 1, the wireless communication network 100 can include multiple APs 102. The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (for example, TVs, computer monitors or video gaming consoles), video game controllers, navigation systems, music or other audio or stereo devices, remote control devices, printers, kitchen appliances (including smart refrigerators) or other household appliances, key fobs (for example, for passive keyless entry and start (PKES) systems), Internet of Things (IoT) devices, and vehicles, among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHZ, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some examples, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct wireless communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHZ, 5 GHz, 6 GHZ, 45 GHz, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHz-7.125 GHZ), FR2 (24.25 GHz-52.6 GHz), FR3 (7.125 GHZ-24.25 GHZ), FR4a or FR4-1 (52.6 GHz-71 GHZ), FR4 (52.6 GHz-114.25 GHZ), and FR5 (114.25 GHz-300 GHz).

Each of the frequency bands may include multiple sub-bands and frequency channels (also referred to as subchannels). For example, PPDUs conforming to the IEEE 802.11n, 802.11ac, 802.11ax, 802.11be, 802.11bn, and 802.11 bp standard amendments may be transmitted over one or more of the 2.4 GHZ, 5 GHZ, or 6 GHZ bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHZ, 240 MHz, 320 MHz, 480 MHz, or 640 MHz by bonding together multiple 20 MHZ channels.

Further, as described herein, the terms "channel" and "subchannel" may be used interchangeably, and each may refer to a portion of a frequency spectrum via which communication between two or more wireless communication devices can be allocated. For example, a channel or subchannel may refer to a discrete portion (such as a discrete amount, span, range, or subset) of frequency of an operating bandwidth. A channel or subchannel may refer to a 20 MHz portion, a 40 MHz portion, an 80 MHZ portion, or a 160 MHz portion, among other examples. In other words, a channel or subchannel may include one or more 20 MHz channels. A primary channel or subchannel may be understood as a portion of a frequency spectrum that includes a primary 20 MHz used for beaconing, among other (management) frame transmissions. A secondary channel or subchannel may be understood as a portion of a frequency spectrum that excludes the primary 20 MHz (or that at least excludes a main primary (M-Primary) channel). In some systems, a secondary channel or subchannel may include an opportunistic primary (O-Primary) channel. A wireless communication device may use an M-Primary channel (such as an M-Primary 20 MHZ) for beaconing and/or serving legacy clients and may use an O-Primary channel (such as an O-Primary 20 MHZ) for opportunistic access on one or more other channels (such as if the M-Primary channel is busy or occupied).

In some aspects, different portions of a frequency spectrum (such as a 40 MHz portion, an 80 MHz portion, or a 160 MHz portion) may be associated with multiple (20 MHz) subchannels and at least one anchor subchannel. In such aspects, an anchor subchannel may define, indicate, or identify a lowest (20 MHZ) subchannel within a given portion of a frequency spectrum. For example, a first anchor subchannel may define, indicate, or identify a lowest 20 MHz subchannel within a secondary 40 MHz bandwidth, a second anchor subchannel may define, indicate, or identify a lowest 20 MHz subchannel within a secondary 80 MHz bandwidth, and a third anchor subchannel may define, indicate, or identify a lowest 20 MHz subchannel within a secondary 160 MHz bandwidth. In some aspects, a wireless communication device may use an anchor subchannel as an O-Primary channel.

In some examples, the AP 102 or the STAs 104 of the wireless communication network 100 may implement Extremely High Throughput (EHT) or other features compliant with current and future generations of the IEEE 802.11 family of wireless communication protocol standards (such as the IEEE 802.11be and 802.11bn standard amendments) to provide additional capabilities over other previous systems (for example, High Efficiency (HE) systems or other legacy systems). For example, the IEEE 802.11be standard amendment introduced 320 MHz channels, which are twice as wide as those possible with the IEEE 802.11ax standard amendment. Accordingly, the AP 102 or the STAs 104 may use 320 MHz channels enabling double the throughput and network capacity, as well as providing rate versus range gains at high data rates due to linear bandwidth versus log SNR trade-off. EHT and newer wireless communication protocols (such as the protocols referred to as or associated with the IEEE 802.11bn standard amendment) may support flexible operating bandwidth enhancements, such as broadened operating bandwidths relative to legacy operating bandwidths or more granular operation relative to legacy operation. For example, an EHT system may allow communications spanning operating bandwidths of 20 MHz, 40 MHz, 80 MHz, 160 MHz, 240 MHz, and 320 MHz. EHT systems may support multiple bandwidth modes such as a contiguous 240 MHz bandwidth mode, a contiguous 320 MHz bandwidth mode, a noncontiguous 160+160 MHz bandwidth mode, or a noncontiguous 80+80+80+80 (or "4×80") MHz bandwidth mode.

In some examples in which a wireless communication device (such as the AP 102 or the STA 104) operates in a contiguous 320 MHz bandwidth mode or a 160+160 MHz bandwidth mode, signals for transmission may be generated by two different transmit chains of the wireless communication device each having or associated with a bandwidth of 160 MHZ (and each coupled to a different power amplifier). In some other examples, two transmit chains can be used to support a 240 MHz/160+80 MHz bandwidth mode by puncturing 320 MHz/160+160 MHz bandwidth modes with one or more 80 MHz subchannels. For example, signals for transmission may be generated by two different transmit chains of the wireless communication device each having a bandwidth of 160 MHz with one of the transmit chains outputting a signal having an 80 MHz subchannel punctured therein. In some other examples in which the wireless communication device may operate in a contiguous 240 MHZ bandwidth mode, or a noncontiguous 160+80 MHz bandwidth mode, the signals for transmission may be generated by three different transmit chains of the wireless communication device, each having a bandwidth of 80 MHz. In some other examples, signals for transmission may be generated by four or more different transmit chains of the wireless communication device, each having a bandwidth of 80 MHz.

In noncontiguous examples, the operating bandwidth may span one or more disparate sub-channel sets. For example, the 320 MHz bandwidth may be contiguous and located in the same 6 GHz band or noncontiguous and located in different bands or regions within a band (such as partly in the 5 GHz band and partly in the 6 GHz band).

In some examples, the AP 102 or the STA 104 may benefit from operability enhancements associated with EHT and newer generations of the IEEE 802.11 family of wireless communication protocol standards. For example, the AP 102 or the STA 104 attempting to gain access to the wireless medium of the wireless communication network 100 may perform techniques (which may include modifications to existing rules, structure, or signaling implemented for legacy systems) such as clear channel assessment (CCA) operation based on EHT enhancements such as increased bandwidth, puncturing, or refinements to carrier sensing and signal reporting mechanisms.

Figure 2:
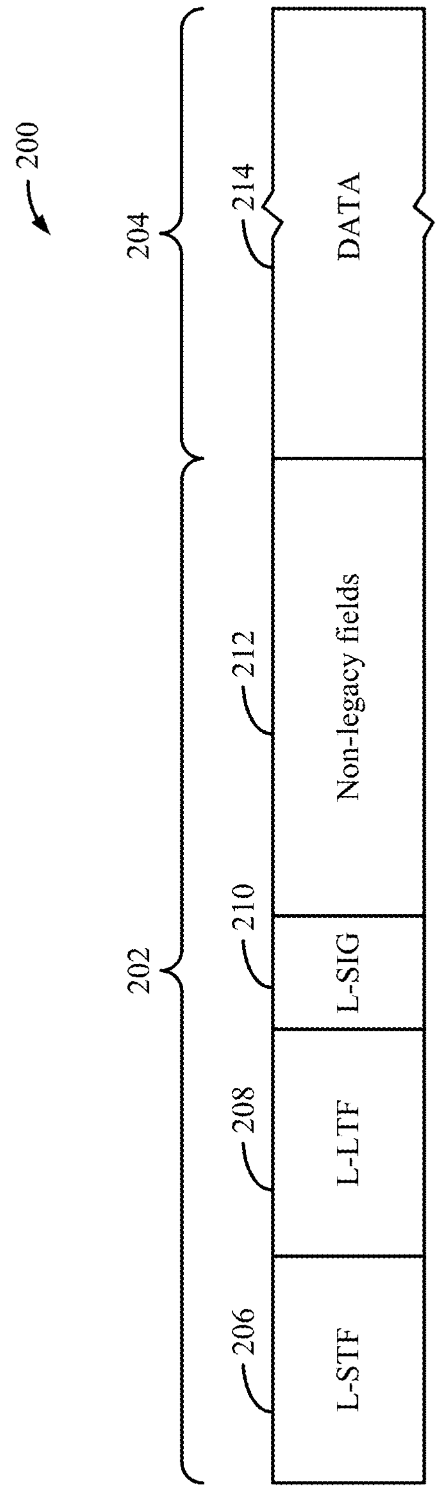
FIG. 2 shows an example protocol data unit (PDU) usable for communications between a wireless access point (AP) and one or more wireless stations (STAs).

FIG. 2 shows an example protocol data unit (PDU) 200 usable for wireless communication between a wireless AP and one or more wireless STAs. For example, the AP and STAs may be examples of the AP 102 and the STAs 104 described with reference to FIG. 1. The PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device (such as an AP 102 or a STA 104) to perform coarse timing and frequency tracking and automatic gain control (AGC). The L-LTF 208 generally enables the receiving device to perform fine timing and frequency tracking and also to perform an initial estimate of the wireless channel. The L-SIG 210 generally enables the receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 3:
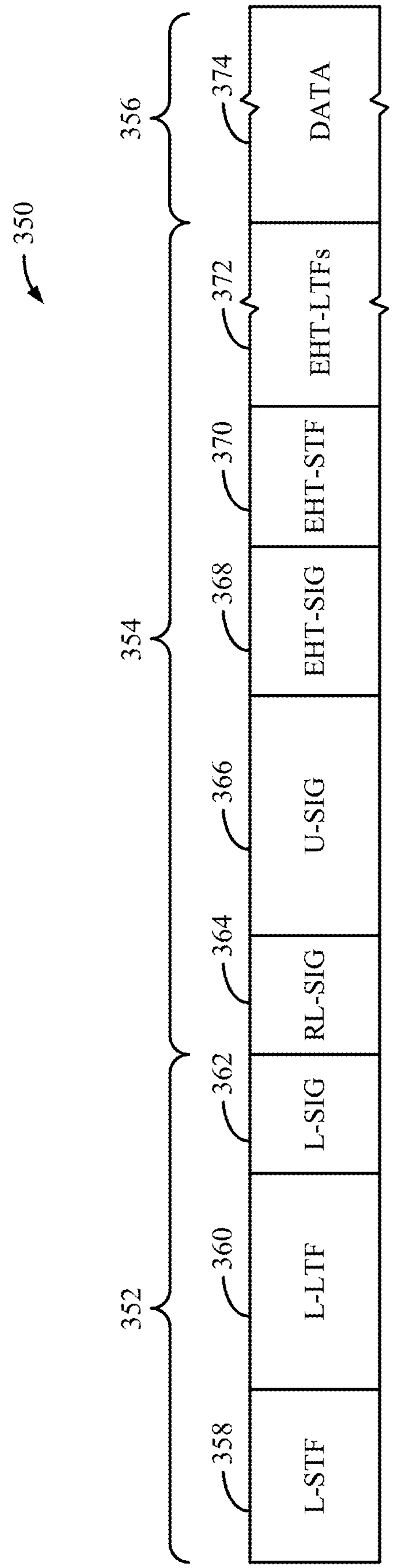
FIG. 3 shows an example physical layer (PHY) protocol data unit (PPDU) usable for communications between a wireless AP and one or more wireless STAs.

FIG. 3 shows an example physical layer (PHY) protocol data unit (PPDU) 350 usable for communications between a wireless AP and one or more wireless STAs. For example, the AP and STAs may be examples of the AP 102 and the STAs 104 described with reference to FIG. 1. As shown, the PPDU 350 includes a PHY preamble, that includes a legacy portion 352 and a non-legacy portion 354, and a payload 356 that includes a data field 374. The legacy portion 352 of the preamble includes an L-STF 358, an L-LTF 360, and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and EHT-SIG 368 may be structured as, and carry version-dependent information for, other wireless communication protocol versions associated with amendments to the IEEE family of standards beyond EHT. For example, U-SIG 366 may be used by a receiving device (such as the AP 102 or the STA 104) to interpret bits in one or more of EHT-SIG 368 or the data field 374. Like L-STF 358, L-LTF 360, and L-SIG 362, the information in U-SIG 366 and EHT-SIG 368 may be duplicated and transmitted in each of the component 20 MHz channels in instances involving the use of a bonded channel.

The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation.

EHT-SIG 368 may be used by an AP 102 to identify and inform one or multiple STAs 104 that the AP 102 has scheduled uplink (UL) or downlink (DL) resources for them. EHT-SIG 368 may be decoded by each compatible STA 104 served by the AP 102. EHT-SIG 368 may generally be used by the receiving device to interpret bits in the data field 374. For example, EHT-SIG 368 may include resource unit (RU) allocation information, spatial stream configuration information, and per-user (for example, STA-specific) signaling information. Each EHT-SIG 368 may include a common field and at least one user-specific field. In the context of OFDMA, the common field can indicate RU distributions to multiple STAs 104, indicate the RU assignments in the frequency domain, indicate which RUs are allocated for MU-MIMO transmissions and which RUs correspond to OFDMA transmissions, and the number of users in allocations, among other examples. The user-specific fields are assigned to particular STAs 104 and carry STA-specific scheduling information such as user-specific MCS values and user-specific RU allocation information. Such information enables the respective STAs 104 to identify and decode corresponding RUs in the associated data field 374.

Figure 4:
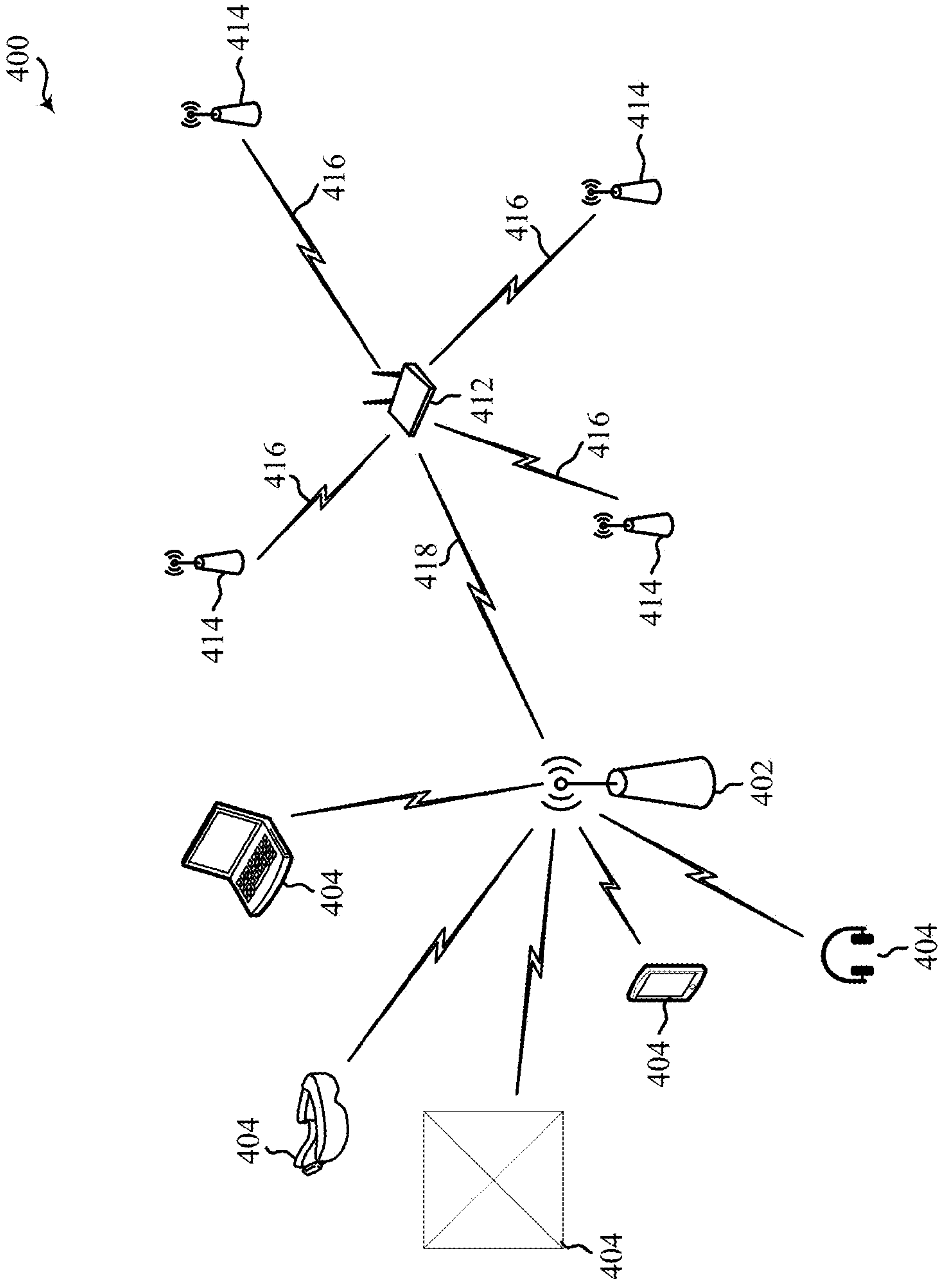
FIG. 4 shows a pictorial diagram of another example wireless communication network.

FIG. 4 shows a pictorial diagram of another example wireless communication network 400. According to some aspects, the wireless communication network 400 can be an example of a mesh network, an IoT network, or a sensor network in accordance with one or more of the IEEE 802.11 family of wireless communication protocol standards (including the 802.11ah amendment). The wireless communication network 400 may include multiple wireless communication devices 414, which in some implementations may include APs 402, STAs 404, or both. The wireless communication devices 414 may represent various devices such as display devices (for example, TVs, computer monitors, navigation systems, among others), music or other audio or stereo devices, remote control devices ("remotes"), printers, kitchen or other household appliances, among other examples.

In some examples, the wireless communication devices 414 sense, measure, collect or otherwise obtain and process data and transmit such raw or processed data to an intermediate device 412 for subsequent processing or distribution. Additionally, or alternatively, the intermediate device 412 may transmit control information, digital content (for example, audio or video data), configuration information or other instructions to the wireless communication devices 414. The intermediate device 412 and the wireless communication devices 414 can communicate with one another via wireless communication links 416. In some examples, the wireless communication links 416 include Bluetooth links or other PAN or short-range communication links.

In some examples, the intermediate device 412 also may be configured for wireless communication with other networks such as with a wireless communication network 100 or a wireless (for example, cellular) wide area network (WWAN), which may, in turn, provide access to external networks including the Internet. For example, the intermediate device 412 may associate and communicate, over a Wi-Fi link 418, with an AP 102 of a WLAN network, which also may serve various STAs 104. In some examples, the intermediate device 412 is an example of a network gateway, for example, an IoT gateway. In such a manner, the intermediate device 412 may serve as an edge network bridge providing a Wi-Fi core backhaul for the IoT network including the wireless communication devices 414. In some examples, the intermediate device 412 can analyze, preprocess and aggregate data received from the wireless communication devices 414 locally at the edge before transmitting it to other devices or external networks via the Wi-Fi link 418. The intermediate device 412 also can provide additional security for the IoT network and the data it transports.

Aspects of transmissions may vary according to a distance between a transmitter (for example, an AP 102 or a STA 104) and a receiver (for example, another AP 102 or STA 104). Wireless communication devices (such as the AP 102 or the STA 104) may generally benefit from having information regarding the location or proximities of the various STAs 104 within the coverage area. In some examples, relevant distances may be determined (for example, calculated or computed) using RTT-based ranging procedures. Additionally, in some examples, APs 102 and STAs 104 may perform ranging operations. Each ranging operation may involve an exchange of fine timing measurement (FTM) frames (such as those defined in the 802.11az amendment to the IEEE family of wireless communication protocol standards) to obtain measurements of RTT transmissions between the wireless communication devices.

Figure 5:
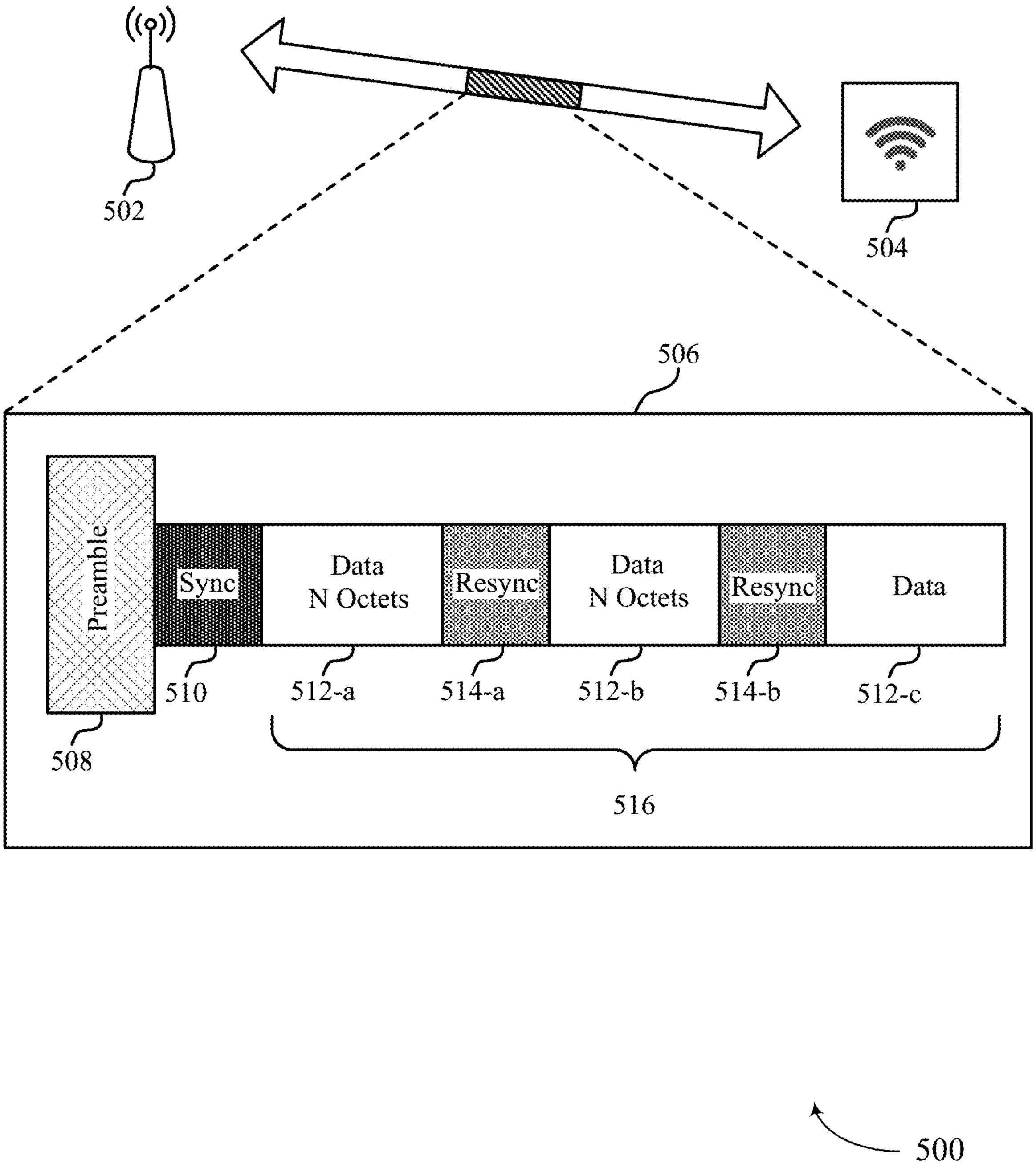
FIG. 5 shows a signaling diagram that supports an ambient power resynchronization field.

FIG. 5 shows an example of a pictorial diagram of a signaling diagram 500 that supports an ambient power resynchronization field. The signaling diagram 500 may implement aspects of, or be implemented by aspects of, the wireless communication network 100, the PDU 200, or the wireless communication network 300. For example, the signaling diagram 500 may include a reader device (such as a reader 502) and an energy harvesting device (such as a tag 504). The reader 502 may be an example of an AP (such as an AP 102), a network entity, a STA (such as a STA 104), a handheld device, a smart phone, a specialized AMP reader, or another device. In some examples, the tag 504 may be an example of a STA (such as STA 104), a handheld device, a smart phone, a specialized AMP reader, or another device. In some aspects, the reader 502, the tag 504, or both, may be considered as 802.11 bp devices, or other 802.11-type devices.

The signaling diagram 500 may be an example of an AMP deployment operating in various wireless frequency bands (such as sub-1 GHz bands or 2.4 GHz bands). In such examples, the signaling diagram 500 may support low-power, low-cost AMP tags (such as a tag 504), which harvest energy to support communication with an AMP reader (such as the reader 502), and expend less power and be less costly than devices with an internal energy source. The energy (or ambient power) may be provided via various methods, including RF frequency transmissions (radio waves), thermal differentials, solar energy, motion, heat, or other energy sources. In some examples, the reader 502 (or some other energizing wireless device) may transmit a wireless energizing waveform (such as transmission of a continuous waveform via one or more frequency bands) to the tag 504, and the tag 504 may utilize energy harvesting circuitry (such as storing wirelessly received energy from the wireless energizing waveform in a capacitor or other energy storage device) to harvest energy for wireless communications with the reader 502.

In some implementations, the tag 504 may include a receiver, such as a low-power wakeup radio (WUR) receiver. The reader 502 may transmit a message (such as a wakeup signal (WUS), a downlink signal, a downlink signal such as a downlink PPDU) to the tag 504 (the tag 504 may receive the message via the WUR). In response to receiving the WUS, the tag 504 may transmit a response message (such as low-complexity data via uplink) to the reader 502. For instance, if the tag 504 has information to transmit to the reader (such as pending uplink data, such as inventory information, status information, sensor information, among other examples), upon receiving the message, the tag 504 may utilize harvested energy to transmit an uplink message to the reader 502. In some examples, the WUS may provide the tag 504 with permission to communicate data with the reader 502.

In some cases, however, the relatively low-cost and low complexity of AMP tags may cause the tag 504 to experience reduced clock accuracy (for example, timing synchronization) over a duration for receiving a data packet. This reduced clock accuracy may in some cases contribute to large sample clock offset and clock drift, as well as large carrier frequency offset over the period of a received data packet (for example, the clock offset may be less accurate than a clock accuracy of +/−1000 parts-per-million relative to more costly devices that support a clock accuracy of +/−20 parts-per-million). This clock drift can have adverse impacts to receiver accuracy and overall device synchronization, especially when receiving large data packets (long PPDU duration) over long periods of time.

To support timing accuracy and to reduce clock drift over long packet durations, the tag 504 may support use of a resynchronization ("resync") field (first resync field 514-*a*, second resync field 514-*b*) added within the data field 516 of a data packet 506 to periodically resynchronize the clock at the receiver of the tag 504. In such cases, the tag 504 may perform ongoing resynchronization of its clock, including performing ongoing symbol timing alignment. For example, the reader 502 may insert a resync field (first resync field 514-*a*, second resync field 514-*b*) in the data field 516 after every "N" octets of data transmitted, so that the tag 504 can perform clock resynchronization without data loss.

The reader 502 may configure the data packet 506 with a legacy preamble 508 (such as the L-STF 206, L-LTF 208, and L-SIG 210 as described with reference to FIG. 2), and a synchronization field (such as sync field 510) that the tag 504 may use for performing an initial clock synchronization. In addition, the reader 502 may configure the data field 516 of the data packet 506 to include one or more resync fields (first resync field 514-*a*, second resync field 514-*b*) after every N octets of data. For example, after the sync field 510, the tag 504 may receive a first set of data 512-*a* (a first N octets of data of the data field 516), and may then perform a first clock resynchronization at the first resync field 514-*a*. After performing the first resynchronization at the first resync field 514-*a*, the tag 504 may receive a second set of data 512-*b* (a second N octets of data of the data field 516), and may then perform a second clock resynchronization at a second resync field 514-*b*. The tag 504 may then receive a third set of data 512-*c* (which may be a third N octets of data of the data field 516, or may be any other amount of data remaining in the data field 516). Although the data packet 506 is illustrated in FIG. 5 as having two resync fields, a data packet may be configured with any amount of resync fields based on the relative size of the data field 516 (for example, based on how many N octets are included in the data field 516). For example, an uplink data packet may be larger in relative size than a downlink packet, and the tag 504 may include resync fields in an uplink data packet to allow the reader 502 to perform resynchronization when receiving an uplink packet from the tag 504. In such examples, the reader 502 may perform timing resynchronization for uplink data to compensate for timing error incurred by the tag 504. In addition, the resync fields may be relatively shorter and less complex than the sync field 510, and may be used to make relatively smaller timing adjustments.

In some examples, the reader 502 may determine a resynchronization periodicity for the tag 504 by determining how often to insert the resync fields (for example, the value for N may be pre-set or preconfigured, N may be dynamically signaled (such as via control signaling), or different values of N may exist for different device classes) based on one or more factors. For example, the reader 502 may select a value for N based on data rate, such as whether a low data rate (LDR) or a high data rate (HDR) is used. In such examples, the reader 502 may select a first value for the N data octets when an LDR is used, and the reader 502 may select a second value for the N data octets when an HDR is used. In some examples, the use of the resync field may reduce overhead and receiver complexity for an ambient device. For example, for a data field with N=6 (such that a resync field is included every six octets of data) and a low data rate, the overhead may be approximately 4%.

The resync fields (first resync field 514-*a*, second resync field 514-*b*) may include a sequence of bits. In some examples, the sequence of bits may be selected based on one or more autocorrelation properties of the sequence. For example, the selected bit sequence for the resync fields may exhibit strong autocorrelation properties (for example, autocorrelation above a threshold) with zero time offset, and weak autocorrelation (for example, autocorrelation below a threshold) with non-zero time offset. These autocorrelation properties of the sequence used to construct the resync field may allow for accurate timing recovery after clock drift has occurred. Some sequences that may be used to construct the resync fields may include (but not be limited to) m-sequences, or any other sequence exhibiting strong autocorrelation.

In some cases, the resync fields (first resync field 514-*a*, second resync field 514-*b*) may be constructed to avoid long "off" periods or silent periods on the medium associated with zeros in the sequence (to avoid the medium or the channel from appearing idle). In such cases, the sequences used for the resync fields may have an equal quantity of zeroes and ones, and may have up to or less than a threshold quantity of adjacent zeros (for example, the maximum quantity of adjacent zeroes may be two adjacent zeros or three adjacent zeroes). For example, a sequence used for a resync field may have a length of 16 total bits, and may include, for example:

$S_1$=[1, 0, 1, 0, 1, 0, 0, 1, 0, 0, 1, 1, 1, 1, 0, 0]

$S_2$=[1, 1, 0, 1, 1, 0, 0, 0, 0, 1, 1, 0, 1, 0, 1, 0]

$S_3$=[1, 1, 1, 0, 0, 0, 1, 0, 1, 0, 0, 1, 0, 0, 1, 1].

The resync field may not be limited to the example sequences given herein, and may include one or more different sequences. In some examples, the resync field may be constructed using 2 us symbols, which may allow for longer bit sequences to be used (relative to longer symbol duration such as 4 us symbols), with higher autocorrelation.

Figure 6:
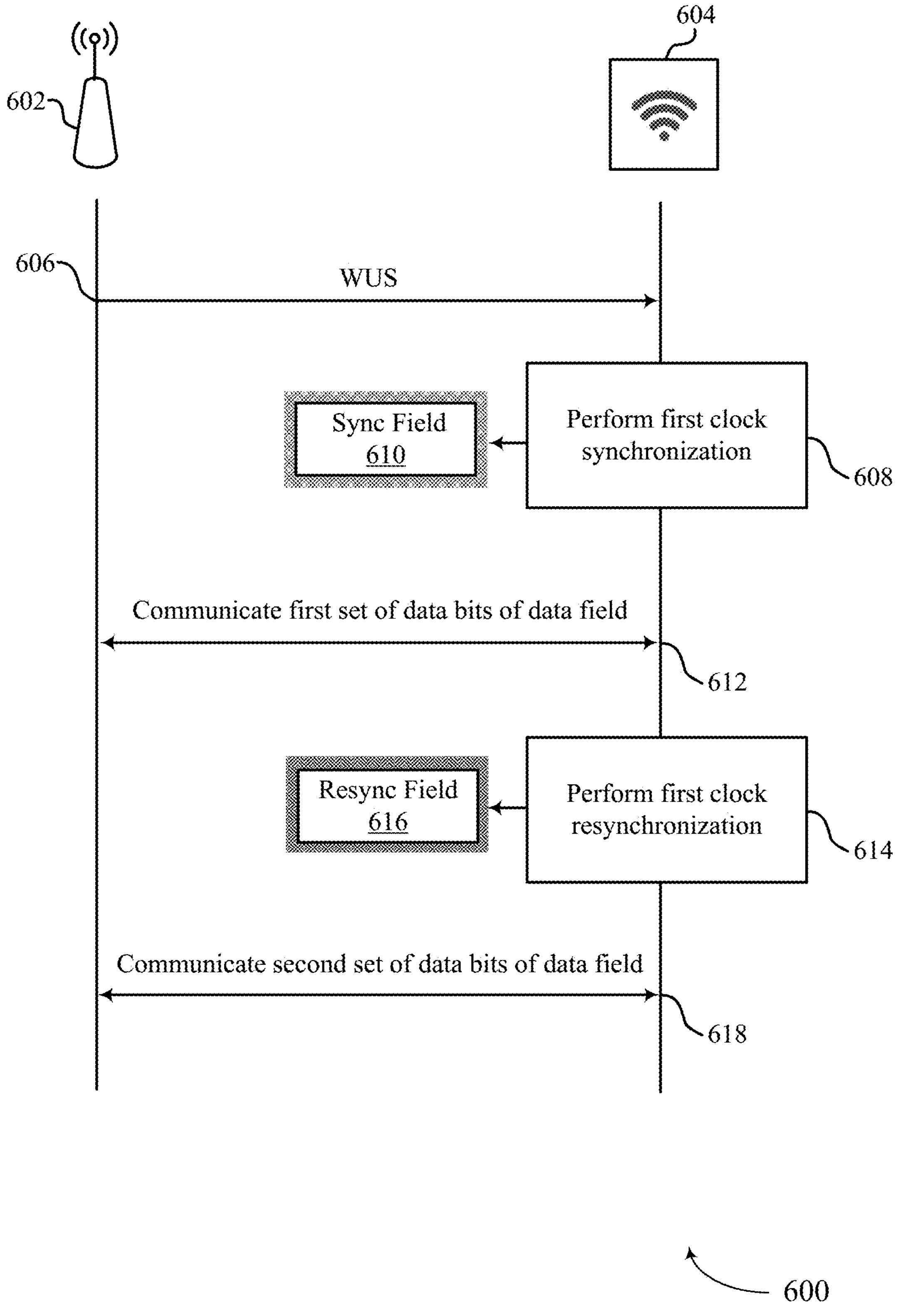
FIG. 6 shows an example of a process flow that supports an ambient power resynchronization field.

FIG. 6 shows an example of a process flow 600 that supports an ambient power resynchronization field. Process flow 600 may implement aspects of, or be implemented by aspects of, the wireless communication network 100, the PDU 200, the wireless communication network 300, or the wireless communication network 400. For example, the process flow 600 may include a reader device (such as a reader 602) and an energy harvesting device (such as a tag 604). The reader 602 may be an example of an AP (such as an AP 102), a network entity, a STA (such as a STA 104), a handheld device, a smart phone, a specialized AMP reader, or another device. In some examples, the tag 604 may be an example of a STA (such as STA 104), a handheld device, a smart phone, a specialized AMP reader, or another device. In some aspects, the reader 602, the tag 604, or both, may be considered as 802.11 bp devices, or other 802.11-type devices.

In the following description of process flow 600, the operations may be performed in a different order than the order shown, or other operations may be added or removed from the process flow 600. For example, some operations may also be left out of process flow 600, may be performed in different orders or at different times, or other operations may be added to process flow 600. Although communications of the process flow 600 are shown occurring between a reader 602 and a tag 604, the operations of process flow 600 may also be performed by one or more other wireless devices, network devices, or network functions.

At 606, the reader 602 may transmit a WUS (or another downlink signal) to the tag 604, and the tag 604 may receive the WUS. In some examples, the WUS may indicate a data packet that is available for communication with the tag 604. For example, the WUS may indicate one or more downlink data packets available for reception by the tag 604. Additionally or alternatively, the tag 604 may obtain permission via the WUS to communicate one or more uplink data packets.

At 608, the tag 604 may begin communication of the data packet by performing a first clock synchronization using a synchronization field 610 (for example, an initial "sync field) of the data packet (such as a PPDU).

At 612, based on the first clock synchronization, the tag 604 may communicate a first set of data bits via a first portion of the data field of the data packet. For example, the tag 604 may receive a first set of data bits of a downlink data packet from the reader 602. Additionally or alternatively, the tag 604 may begin to transmit a first set of data bits of an uplink data packet to the reader 602. In some examples of uplink communication, an uplink data packet may be longer in duration than a downlink data packet (in some examples, the uplink data packet may have a larger payload than the downlink data packet).

At 614, the tag 604 may perform a first clock resynchronization using a first resynchronization field 616 (a "resync field") of the data packet. In some examples, the tag 604 may use the first resynchronization field 616 to adjust a symbol timing alignment and correct for timing drift that may occur over the duration of the data packet. In such examples, the first resynchronization field 616 may occur subsequent to communicating the first set of data bits of the data field. The first resynchronization field 616 may be shorter in duration than the synchronization field 610.

In some examples, the first resynchronization field may include a sequence of bits that is selected based on one or more autocorrelation properties of the sequence of bits. For example, the sequence of bits may be selected such that the sequence of bits has an autocorrelation that exceeds an autocorrelation threshold when a clock offset is less than an offset threshold, and has an autocorrelation that is less than the autocorrelation threshold when the clock offset exceeds the offset threshold. In some examples, the sequence of bits may include a quantity of zeros and ones, and the quantity of zeros may be equal to the quantity of ones (although other quantities of zeros and ones are possible, for example, the quantity of zeros may be greater than the quantity of ones, or the quantity of zeroes may be less than the quantity of ones). In some examples, the bit sequence may include one or more sets of adjacent zeros which have a quantity of adjacent zeros that is less than or equal to a threshold quantity of adjacent zeros. For example, the threshold quantity of adjacent zeros may be configured to reduce the likelihood that the medium appears idle during the resynchronization field.

Some possible bit sequences that may be used for the resynchronization field include a sixteen bit sequence, for example, at least [1, 0, 1, 0, 1, 0, 0, 1, 0, 0, 1, 1, 1, 1, 0, 0], or [1, 1, 0, 1, 1, 0, 0, 0, 0, 1, 1, 0, 1, 0, 1, 0], or [1, 1, 1, 0, 0, 0, 1, 0, 1, 0, 0, 1, 0, 0, 1, 1].

At 618, the tag 604 may communicate a second set of data bits via a second portion of the data field based on the symbol timing alignment of the first clock resynchronization. For example, after resynchronizing the symbol timing during the first resynchronization field 616, the tag 604 may either transmit the second set of data bits (for example, uplink data) to the reader 602 or receive the second set of data bits (for example, downlink data) from the reader 602.

In some examples, the tag 604 may communicate one or more additional sets of data bits via one or more additional portions of the data field (such as based on the size of the payload of the data packet). In such examples, there may be additional resynchronization fields inserted in the data field so that the tag 604 may perform one or more additional clock resynchronizations subsequent to the second portion of the data field. In some examples, the tag 604 may perform a second clock resynchronization using a second resynchronization field occurring subsequent to the second portion of the data field. In some cases, the first resynchronization field and the second resynchronization field (and any other additional resynchronization fields) may be separated by a quantity of data bits associated with a resynchronization field periodicity. For example, the resynchronization field periodicity may include a resynchronization field every "N" sets of data (for example, one or more octets or bytes of data) of the data field. In some examples, the resynchronization field periodicity may be based on a data rate of the data packet such that the resynchronization field periodicity is set based on a high data rate or a low data rate (or other possible data rates) configured for the data packet.

In some examples, the tag 604 may communicate the data packet via one or more symbols (for example, one or more uplink symbols, one or more downlink symbols) which include either a 2 us symbol or a 4 us symbol, and the first resynchronization field 616 may be constructed using one or more 2 us symbols. In cases where the data packet includes a sequence of bits including a quantity of zeros and a quantity of ones, the tag 604 may perform on-off-keying (OOK) modulation to map each zero of the quantity of zeroes to an "off" symbol, and each one of the quantity of ones to an "on" symbol.

Figure 7:
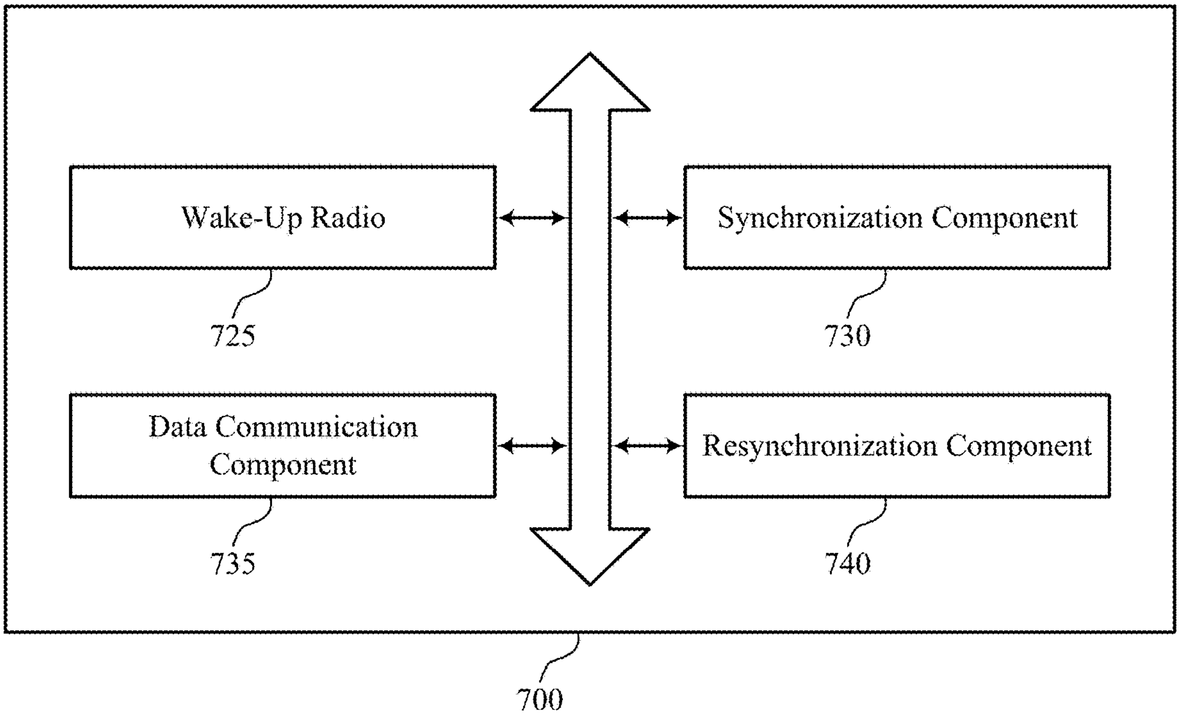
FIG. 7 shows a block diagram of an example wireless communication device that supports an ambient power resynchronization field.

FIG. 7 shows a block diagram of an example wireless communication device 700 that supports an ambient power resynchronization field. In some examples, the wireless communication device 700 is configured to perform the method 900 and the method 1000 described with reference to FIGS. 9 and 10, respectively. The wireless communication device 700 may include one or more chips, SoCs, chipsets, packages, components or devices that individually or collectively constitute or include a processing system. The processing system may interface with other components of the wireless communication device 700, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 700 may transmit the information output from the chip. In such an example, the second interface may refer to an interface between the processing system of the chip and a reception component, such that the wireless communication device 700 may receive information that is then passed to the processing system. In some such examples, the first interface also may obtain information, such as from the transmission component, and the second interface also may output information, such as to the reception component.

The processing system of the wireless communication device 700 includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). In some examples, low power devices or low complexity devices such as tags may support code stored in ROM but may not support code stored in RAM, based on reduced capabilities of the tags. In some examples, the processor circuitry may be implemented in custom hardware that may or may not be programmable based on processor cost or complexity considerations. One or more of the memories may be coupled with one or more of the processors and may individually or collectively store processor-executable code that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 700 can be configurable or configured for use in a STA or UE, such as the AP 102 or the STA 104 described with reference to FIG. 1. In some other examples, the wireless communication device 700 can be a STA or UE that includes such a processing system and other components including multiple antennas. The wireless communication device 700 is capable of transmitting and receiving wireless communications in the form of, for example, wireless packets. For example, the wireless communication device 700 can be configurable or configured to transmit and receive packets in the form of physical layer PPDUs and MPDUs conforming to one or more of the IEEE 802.11 family of wireless communication protocol standards. In some other examples, the wireless communication device 700 can be configurable or configured to transmit and receive signals and communications conforming to one or more 3GPP specifications including those for 5G NR or 6G. In some examples, the wireless communication device 700 also includes or can be coupled with one or more application processors which may be further coupled with one or more other memories. In some examples, the wireless communication device 700 further includes a user interface (UI) (such as a touchscreen or keypad) and a display, which may be integrated with the UI to form a touchscreen display that is coupled with the processing system. In some examples, the wireless communication device 700 may further include one or more sensors such as, for example, one or more inertial sensors, accelerometers, temperature sensors, pressure sensors, or altitude sensors, that are coupled with the processing system. In some examples, the wireless communication device 700 further includes at least one external network interface coupled with the processing system that enables communication with a core network or backhaul network that enables the wireless communication device 700 to gain access to external networks including the Internet.

The wireless communication device 700 includes a wake-up radio 725, a synchronization component 730, a data communication component 735, and a resynchronization component 740. Portions of one or more of the wake-up radio 725, the synchronization component 730, the data communication component 735, and the resynchronization component 740 may be implemented at least in part in hardware or firmware. For example, one or more of the wake-up radio 725, the synchronization component 730, the data communication component 735, and the resynchronization component 740 may be implemented at least in part by at least a processor or a modem. In some examples, portions of one or more of the wake-up radio 725, the synchronization component 730, the data communication component 735, and the resynchronization component 740 may be implemented at least in part by a processor and software in the form of processor-executable code stored in memory.

The wireless communication device 700 may support wireless communications in accordance with examples as disclosed herein. The wake-up radio 725 is configurable or configured to receive, from a reader device, a wake-up signal indicating a data packet available for communication with the ambient wireless device. The synchronization component 730 is configurable or configured to perform a first clock synchronization using a synchronization field of the data packet. The data communication component 735 is configurable or configured to communicate, based on the first clock synchronization, a first set of data bits via a first portion of a data field of the data packet. The resynchronization component 740 is configurable or configured to perform a first clock resynchronization using a first resynchronization field of the data packet to adjust a symbol timing alignment for communication with the ambient wireless device, where the first resynchronization field occurs subsequent to the first portion of the data field. In some examples, the data communication component 735 is configurable or configured to communicate, based on the symbol timing alignment of the first clock resynchronization, a second set of data bits via a second portion of the data field.

In some examples, the data communication component 735 is configurable or configured to communicate, based on the first clock resynchronization, one or more additional sets of data bits via one or more additional portions of the data field. In some examples, the resynchronization component 740 is configurable or configured to perform one or more additional clock resynchronizations using one or more additional resynchronization fields of the data packet subsequent to the second portion of the data field.

In some examples, the resynchronization component 740 is configurable or configured to perform a second clock resynchronization using a second resynchronization field occurring subsequent to the second portion of the data field, where the first resynchronization field and the second resynchronization field are separated by a quantity of data bits associated with a resynchronization field periodicity.

In some examples, the quantity of data bits associated with the resynchronization field periodicity is based on a data rate of the data packet. In some examples, the quantity of data bits associated with the resynchronization field periodicity include one or more data octets. In some examples, the first resynchronization field includes a sequence of bits that is selected based on one or more autocorrelation properties of the sequence of bits. In some examples, the sequence of bits has an autocorrelation that exceeds an autocorrelation threshold when a clock offset is less than an offset threshold, and the sequence of bits has an autocorrelation that is less than the autocorrelation threshold when the clock offset exceeds the offset threshold.

In some examples, the sequence of bits includes a quantity of zeros and a quantity of ones, the quantity of zeros being equal to the quantity of ones. In some examples, the sequence of bits includes one or more sets of adjacent zeros, the one or more sets of adjacent zeros including a quantity of zeros that is less than or equal to a threshold quantity of zeros.

In some examples, the sequence of bits includes at least one of [1, 0, 1, 0, 1, 0, 0, 1, 0, 0, 1, 1, 1, 1, 0, 0], or [1, 1, 0, 1, 1, 0, 0, 0, 0, 1, 1, 0, 1, 0, 1, 0], or [1, 1, 1, 0, 0, 0, 1, 0, 1, 0, 0, 1, 0, 0, 1, 1].

In some examples, the data communication component 735 is configurable or configured to communicate the data packet via one or more symbols, where each symbol of the one or more symbols includes a two-microsecond symbol or a four-microsecond symbol.

In some examples, the data packet includes a sequence of bits including a quantity of zeros and a quantity of ones, and the data communication component 735 is configurable or configured to perform on-off-keying modulation to map each zero of the quantity of zeros to an off symbol of the one or more symbols and each one of the quantity of ones to an on symbol of the one or more symbols.

In some examples, the first resynchronization field spans one or more two-microsecond symbols.

In some examples, the first resynchronization field is shorter in duration than the synchronization field.

In some examples, the data packet includes an uplink data packet or a downlink data packet, the uplink data packet including a larger data payload than the downlink data packet.

In some examples, to support receiving the wake-up signal, the wake-up radio 725 is configurable or configured to obtain, via one or more indications in the wake-up signal, permission from the reader device to communicate the data packet.

Figure 8:
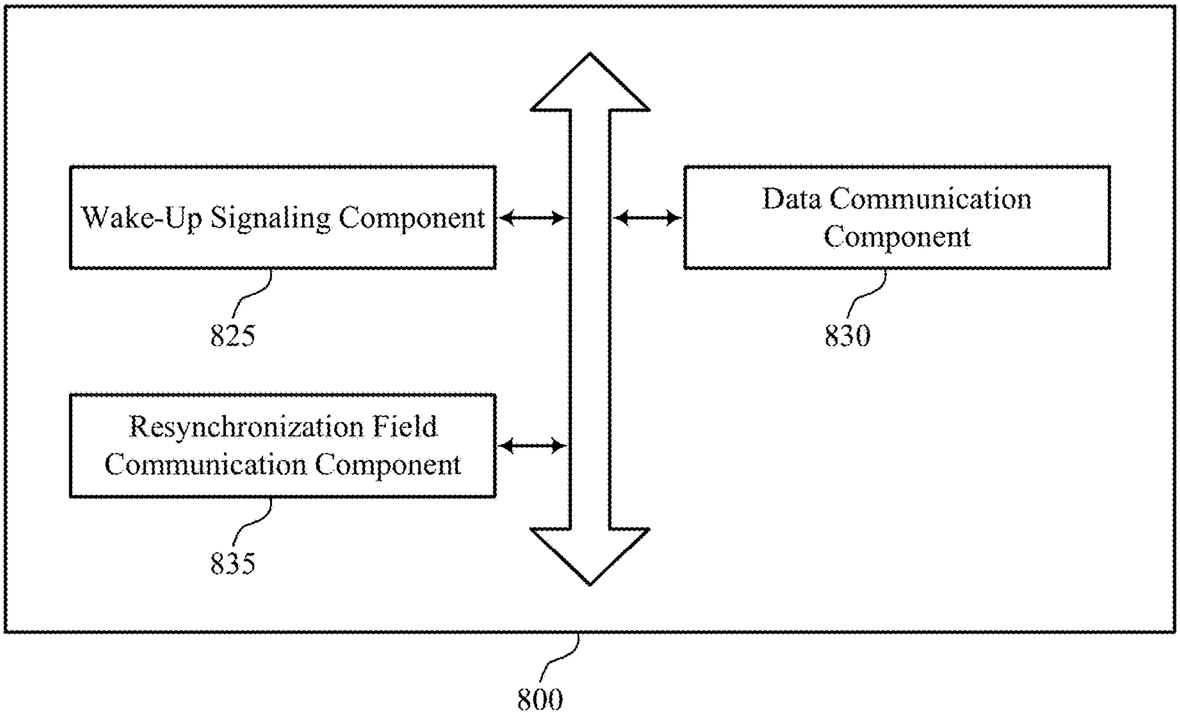
FIG. 8 shows a block diagram of an example wireless communication device that supports an ambient power resynchronization field.

FIG. 8 shows a block diagram of an example wireless communication device 800 that supports an ambient power resynchronization field. In some examples, the wireless communication device 800 is configured to perform the method 900 and the method 1000 described with reference to FIGS. 9 and 10, respectively. The wireless communication device 800 may include one or more chips, SoCs, chipsets, packages, components or devices that individually or collectively constitute or include a processing system. The processing system may interface with other components of the wireless communication device 800, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 800 may transmit the information output from the chip. In such an example, the second interface may refer to an interface between the processing system of the chip and a reception component, such that the wireless communication device 800 may receive information that is then passed to the processing system. In some such examples, the first interface also may obtain information, such as from the transmission component, and the second interface also may output information, such as to the reception component.

The processing system of the wireless communication device 800 includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. In some examples, the processor circuitry may be implemented in custom hardware that may or may not be programmable based on processor cost or complexity considerations. The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 800 can be configurable or configured for use in an AP or UE, such as the AP 102 or the STA 104 described with reference to FIG. 1. In some other examples, the wireless communication device 800 can be an AP or UE that includes such a processing system and other components including multiple antennas. The wireless communication device 800 is capable of transmitting and receiving wireless communications in the form of, for example, wireless packets. For example, the wireless communication device 800 can be configurable or configured to transmit and receive packets in the form of physical layer PPDUs and MPDUs conforming to one or more of the IEEE 802.11 family of wireless communication protocol standards. In some other examples, the wireless communication device 800 can be configurable or configured to transmit and receive signals and communications conforming to one or more 3GPP specifications including those for 5G NR or 6G. In some examples, the wireless communication device 800 also includes or can be coupled with one or more application processors which may be further coupled with one or more other memories. In some examples, the wireless communication device 800 further includes a user interface (UI) (such as a touchscreen or keypad) and a display, which may be integrated with the UI to form a touchscreen display that is coupled with the processing system. In some examples, the wireless communication device 800 may further include one or more sensors such as, for example, one or more inertial sensors, accelerometers, temperature sensors, pressure sensors, or altitude sensors, that are coupled with the processing system. In some examples, the wireless communication device 800 further includes at least one external network interface coupled with the processing system that enables communication with a core network or backhaul network that enables the wireless communication device 800 to gain access to external networks including the Internet.

The wireless communication device 800 includes a wake-up signaling component 825, a data communication component 830, and a resynchronization field communication component 835. Portions of one or more of the wake-up signaling component 825, the data communication component 830, and the resynchronization field communication component 835 may be implemented at least in part in hardware or firmware. For example, one or more of the wake-up signaling component 825, the data communication component 830, and the resynchronization field communication component 835 may be implemented at least in part by at least a processor or a modem. In some examples, portions of one or more of the wake-up signaling component 825, the data communication component 830, and the resynchronization field communication component 835 may be implemented at least in part by a processor and software in the form of processor-executable code stored in memory.

The wireless communication device 800 may support wireless communications in accordance with examples as disclosed herein. The wake-up signaling component 825 is configurable or configured to transmit, to an ambient communication device, a wake-up signal indicating a data packet available for communication with the ambient communication device. The data communication component 830 is configurable or configured to communicate a first set of data bits via a first portion of a data field of the data packet with the ambient communication device. The resynchronization field communication component 835 is configurable or configured to communicate a first resynchronization field of the data packet for adjusting a symbol timing alignment of the ambient communication device, where the first resynchronization field occurs subsequent to the first portion of the data field. In some examples, the resynchronization field communication component 835 is configurable or configured to communicate, based on the communication of the first resynchronization field, a second set of data bits via a second portion of the data field.

In some examples, the data communication component 830 is configurable or configured to communicate, based on the communication of the second set of data bits, one or more additional sets of data bits via one or more additional portions of the data field. In some examples, the resynchronization field communication component 835 is configurable or configured to communicate one or more additional resynchronization fields of the data packet subsequent to the second portion of the data field for adjusting the symbol timing alignment of the ambient communication device.

In some examples, the resynchronization field communication component 835 is configurable or configured to communicate a second resynchronization field occurring subsequent to the second portion of the data field, where the first resynchronization field and the second resynchronization field are separated by a quantity of data bits associated with a resynchronization field periodicity.

In some examples, the quantity of data bits associated with the resynchronization field periodicity is based on a data rate of the data packet. In some examples, the quantity of data bits associated with the resynchronization field periodicity include one or more data octets. In some examples, the first resynchronization field includes a sequence of bits that is selected based on one or more autocorrelation properties of the sequence of bits. In some examples, the sequence of bits has an autocorrelation that exceeds an autocorrelation threshold when a clock offset is less than an offset threshold, and the sequence of bits has an autocorrelation that is less than the autocorrelation threshold when the clock offset exceeds the offset threshold.

In some examples, the sequence of bits includes a quantity of zeros and a quantity of ones, the quantity of zeros being equal to the quantity of ones. In some examples, the sequence of bits includes one or more sets of adjacent zeros, the one or more sets of adjacent zeros including a quantity of zeros that is less than or equal to a threshold quantity of zeros.

In some examples, the sequence of bits includes at least one of [1, 0, 1, 0, 1, 0, 0, 1, 0, 0, 1, 1, 1, 1, 0, 0], or [1, 1, 0, 1, 1, 0, 0, 0, 0, 1, 1, 0, 1, 0, 1, 0], or [1, 1, 1, 0, 0, 0, 1, 0, 1, 0, 0, 1, 0, 0, 1, 1].

In some examples, the first resynchronization field spans one or more two-microsecond symbols. In some examples, the data packet includes an uplink data packet or a downlink data packet, the uplink data packet including a larger data payload than the downlink data packet.

In some examples, to support transmitting the wake-up signal, the wake-up signaling component 825 is configurable or configured to transmit, via one or more indications in the wake-up signal, permission for the ambient communication device to communicate the data packet.

Figure 9:
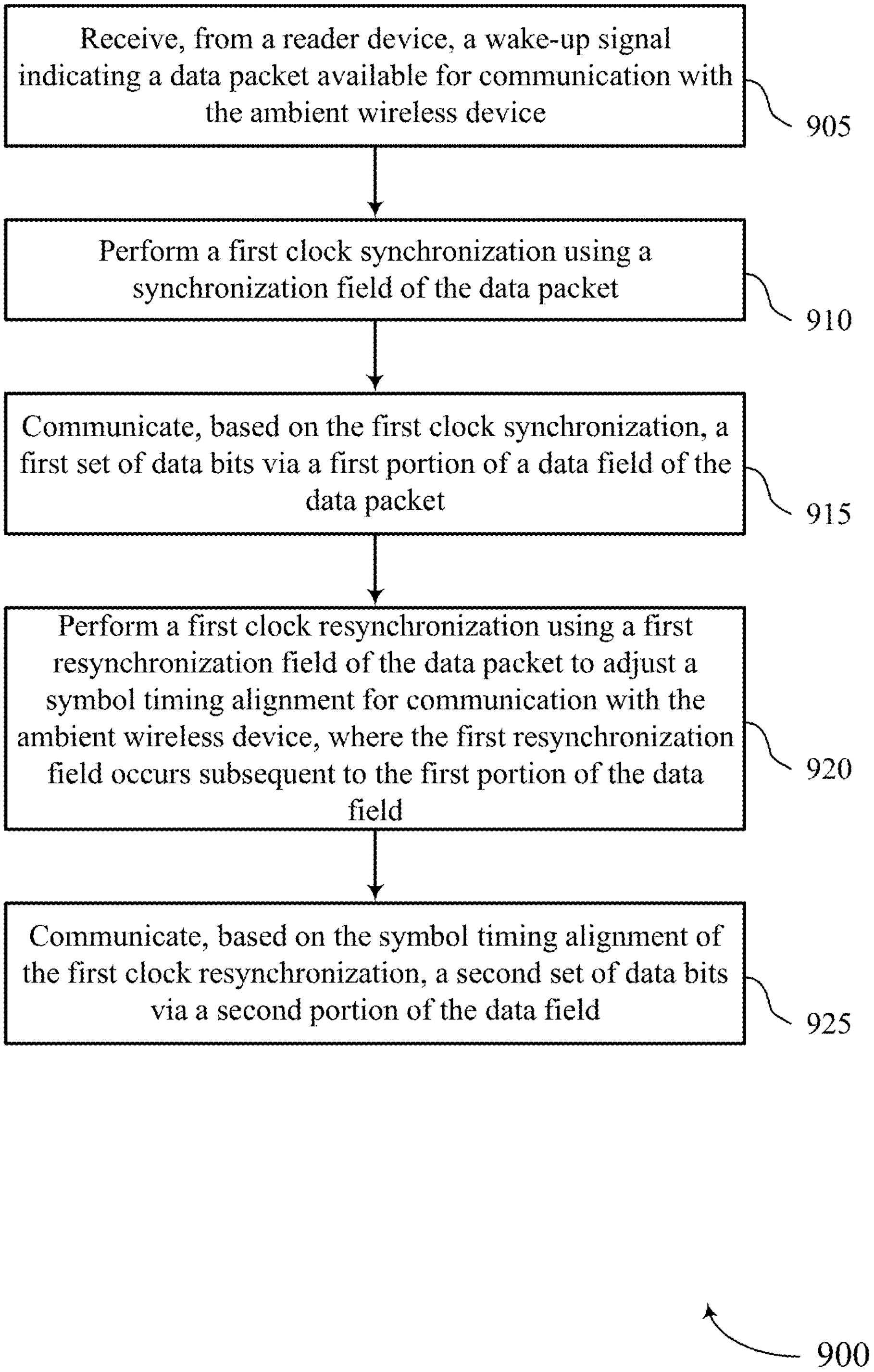
FIG. 9 shows a flowchart illustrating an example process performable by or at an ambient wireless device that supports an ambient power resynchronization field.

FIG. 9 shows a flowchart illustrating a method 900 that supports an ambient power resynchronization field in accordance with one or more aspects of the present disclosure. The operations of the method 900 may be implemented by a STA or a UE or its components as described herein. For example, the operations of the method 900 may be performed by a STA or a UE as described with reference to FIGS. 2 through 7. In some examples, a STA or a UE may execute a set of instructions to control the functional elements of the wireless STA or the UE to perform the described functions. Additionally, or alternatively, the wireless STA or the UE may perform aspects of the described functions using special-purpose hardware.

In some examples, in block 905, the ambient wireless device may receive, from a reader device, a wake-up signal indicating a data packet available for communication with the ambient wireless device. The operations of block 905 may be performed in accordance with examples as disclosed herein. In some implementations, aspects of the operations of block 905 may be performed by a wake-up radio 725 as described with reference to FIG. 7.

In some examples, in block 910, the ambient wireless device may perform a first clock synchronization using a synchronization field of the data packet. The operations of block 910 may be performed in accordance with examples as disclosed herein. In some implementations, aspects of the operations of block 910 may be performed by a synchronization component 730 as described with reference to FIG. 7.

In some examples, in block 915, the ambient wireless device may communicate, based on the first clock synchronization, a first set of data bits via a first portion of a data field of the data packet. The operations of block 915 may be performed in accordance with examples as disclosed herein. In some implementations, aspects of the operations of block 915 may be performed by a data communication component 735 as described with reference to FIG. 7.

In some examples, in block 920, the ambient wireless device may perform a first clock resynchronization using a first resynchronization field of the data packet to adjust a symbol timing alignment for communication with the ambient wireless device, where the first resynchronization field occurs subsequent to the first portion of the data field. The operations of block 920 may be performed in accordance with examples as disclosed herein. In some implementations, aspects of the operations of block 920 may be performed by a resynchronization component 740 as described with reference to FIG. 7.

In some examples, in block 925, the ambient wireless device may communicate, based on the symbol timing alignment of the first clock resynchronization, a second set of data bits via a second portion of the data field. The operations of block 925 may be performed in accordance with examples as disclosed herein. In some implementations, aspects of the operations of block 925 may be performed by a data communication component 735 as described with reference to FIG. 7.

Figure 10:
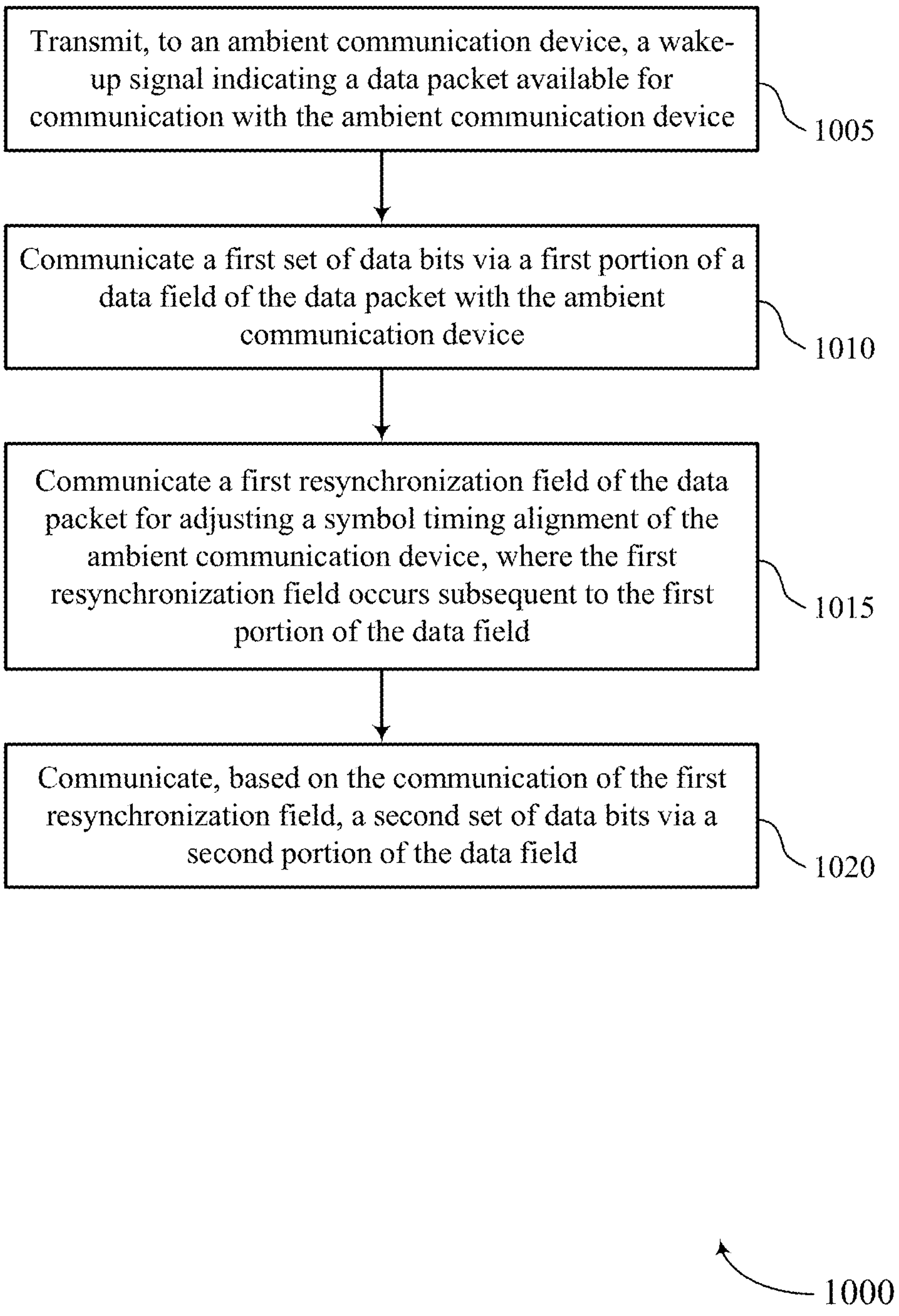
FIG. 10 shows a flowchart illustrating an example process performable by or at a reader device that supports an ambient power resynchronization field.

FIG. 10 shows a flowchart illustrating a method 1000 that supports an ambient power resynchronization field in accordance with one or more aspects of the present disclosure. The operations of the method 1000 may be implemented by an AP or a UE or its components as described herein. For example, the operations of the method 1000 may be performed by an AP or a UE as described with reference to FIGS. 2 through 6 and 8. In some examples, an AP or a UE may execute a set of instructions to control the functional elements of the wireless AP or the UE to perform the described functions. Additionally, or alternatively, the wireless AP or the UE may perform aspects of the described functions using special-purpose hardware.

In some examples, in block 1005, the reader device may transmit, to an ambient communication device, a wake-up signal indicating a data packet available for communication with the ambient communication device. The operations of block 1005 may be performed in accordance with examples as disclosed herein. In some implementations, aspects of the operations of block 1005 may be performed by a wake-up signaling component 825 as described with reference to FIG. 8.

In some examples, in block 1010, the reader device may communicate a first set of data bits via a first portion of a data field of the data packet with the ambient communication device. The operations of block 1010 may be performed in accordance with examples as disclosed herein. In some implementations, aspects of the operations of block 1010 may be performed by a data communication component 830 as described with reference to FIG. 8.

In some examples, in block 1015, the reader device may communicate a first resynchronization field of the data packet for adjusting a symbol timing alignment of the ambient communication device, where the first resynchronization field occurs subsequent to the first portion of the data field. The operations of block 1015 may be performed in accordance with examples as disclosed herein. In some implementations, aspects of the operations of block 1015 may be performed by a resynchronization field communication component 835 as described with reference to FIG. 8.

In some examples, in block 1020, the reader device may communicate, based on the communication of the first resynchronization field, a second set of data bits via a second portion of the data field. The operations of block 1020 may be performed in accordance with examples as disclosed herein. In some implementations, aspects of the operations of block 1020 may be performed by a resynchronization field communication component 835 as described with reference to FIG. 8.

Implementation examples are described in the following numbered clauses:

The following provides an overview of aspects of the present disclosure:

Aspect 1: A method for wireless communications at an ambient wireless device, comprising: receiving, from a reader device, a wake-up signal indicating a data packet available for communication with the ambient wireless device; performing a first clock synchronization using a synchronization field of the data packet; communicating, based at least in part on the first clock synchronization, a first set of data bits via a first portion of a data field of the data packet; performing a first clock resynchronization using a first resynchronization field of the data packet to adjust a symbol timing alignment for communication with the ambient wireless device, where the first resynchronization field occurs subsequent to the first portion of the data field; and communicating, based at least in part on the symbol timing alignment of the first clock resynchronization, a second set of data bits via a second portion of the data field.

Aspect 2: The method of aspect 1, further comprising: communicating, based at least in part on the first clock resynchronization, one or more additional sets of data bits via one or more additional portions of the data field; and performing one or more additional clock resynchronizations using one or more additional resynchronization fields of the data packet subsequent to the second portion of the data field.

Aspect 3: The method of any of aspects 1-2, further comprising: performing a second clock resynchronization using a second resynchronization field occurring subsequent to the second portion of the data field, where the first resynchronization field and the second resynchronization field are separated by a quantity of data bits associated with a resynchronization field periodicity.

Aspect 4: The method of aspect 3, where the quantity of data bits associated with the resynchronization field periodicity is based at least in part on a data rate of the data packet.

Aspect 5: The method of any of aspects 3-4, where the quantity of data bits associated with the resynchronization field periodicity include one or more data octets.

Aspect 6: The method of any of aspects 1-5, where the first resynchronization field includes a sequence of bits that is selected based at least in part on one or more autocorrelation properties of the sequence of bits.

Aspect 7: The method of aspect 6, where the sequence of bits has an autocorrelation that exceeds an autocorrelation threshold when a clock offset is less than an offset threshold, and the sequence of bits has an autocorrelation that is less than the autocorrelation threshold when the clock offset exceeds the offset threshold.

Aspect 8: The method of any of aspects 6-7, where the sequence of bits includes a quantity of zeros and a quantity of ones, the quantity of zeros being equal to the quantity of ones.

Aspect 9: The method of any of aspects 6-8, where the sequence of bits includes one or more sets of adjacent zeros, the one or more sets of adjacent zeros including a quantity of zeros that is less than or equal to a threshold quantity of zeros.

Aspect 10: The method of any of aspects 6-9, where the sequence of bits includes at least one of [1, 0, 1, 0, 1, 0, 0, 1, 0, 0, 1, 1, 1, 1, 0, 0], or [1, 1, 0, 1, 1, 0, 0, 0, 0, 1, 1, 0, 1, 0, 1, 0], or [1, 1, 1, 0, 0, 0, 1, 0, 1, 0, 0, 1, 0, 0, 1, 1].

Aspect 11: The method of any of aspects 1-10, further comprising: communicating the data packet via one or more symbols, where each symbol of the one or more symbols includes a two-microsecond symbol or a four-microsecond symbol.

Aspect 12: The method of aspect 11, where the where the data packet includes a sequence of bits including a quantity of zeros and a quantity of ones, the method further comprising: performing on-off-keying modulation to map each zero of the quantity of zeros to an off symbol of the one or more symbols and each one of the quantity of ones to an on symbol of the one or more symbols.

Aspect 13: The method of any of aspects 11-12, where the first resynchronization field spans one or more two-microsecond symbols.

Aspect 14: The method of any of aspects 1-13, where the first resynchronization field is shorter in duration than the synchronization field.

Aspect 15: The method of any of aspects 1-14, where the data packet includes an uplink data packet or a downlink data packet, the uplink data packet comprising a larger data payload than the downlink data packet.

Aspect 16: The method of any of aspects 1-15, where receiving the wake-up signal includes: obtaining, via one or more indications in the wake-up signal, permission from the reader device to communicate the data packet.

Aspect 17: A method for wireless communications at a reader device, comprising: transmitting, to an ambient communication device, a wake-up signal indicating a data packet available for communication with the ambient communication device; communicating a first set of data bits via a first portion of a data field of the data packet with the ambient communication device; communicating a first resynchronization field of the data packet for adjusting a symbol timing alignment of the ambient communication device, where the first resynchronization field occurs subsequent to the first portion of the data field; and communicating, based at least in part on the communication of the first resynchronization field, a second set of data bits via a second portion of the data field.

Aspect 18: The method of aspect 17, further comprising: communicating, based at least in part on the communication of the second set of data bits, one or more additional sets of data bits via one or more additional portions of the data field; and communicating one or more additional resynchronization fields of the data packet subsequent to the second portion of the data field for adjusting the symbol timing alignment of the ambient communication device.

Aspect 19: The method of any of aspects 17-18, further comprising: communicating a second resynchronization field occurring subsequent to the second portion of the data field, where the first resynchronization field and the second resynchronization field are separated by a quantity of data bits associated with a resynchronization field periodicity.

Aspect 20: The method of aspect 19, where the quantity of data bits associated with the resynchronization field periodicity is based at least in part on a data rate of the data packet.

Aspect 21: The method of any of aspects 19-20, where the quantity of data bits associated with the resynchronization field periodicity include one or more data octets.

Aspect 22: The method of any of aspects 17-21, where the first resynchronization field includes a sequence of bits that is selected based at least in part on one or more autocorrelation properties of the sequence of bits.

Aspect 23: The method of aspect 22, where the sequence of bits has an autocorrelation that exceeds an autocorrelation threshold when a clock offset is less than an offset threshold, and the sequence of bits has an autocorrelation that is less than the autocorrelation threshold when the clock offset exceeds the offset threshold.

Aspect 24: The method of any of aspects 22-23, where the sequence of bits includes a quantity of zeros and a quantity of ones, the quantity of zeros being equal to the quantity of ones.

Aspect 25: The method of any of aspects 22-24, where the sequence of bits includes one or more sets of adjacent zeros, the one or more sets of adjacent zeros including a quantity of zeros that is less than or equal to a threshold quantity of zeros.

Aspect 26: The method of any of aspects 22-25, where the sequence of bits includes at least one of [1, 0, 1, 0, 1, 0, 0, 1, 0, 0, 1, 1, 1, 1, 0, 0], or [1, 1, 0, 1, 1, 0, 0, 0, 0, 1, 1, 0, 1, 0, 1, 0], or [1, 1, 1, 0, 0, 0, 1, 0, 1, 0, 0, 1, 0, 0, 1, 1].

Aspect 27: The method of any of aspects 17-26, where the first resynchronization field spans one or more two-microsecond symbols.

Aspect 28: The method of any of aspects 17-27, where the data packet includes an uplink data packet or a downlink data packet, the uplink data packet comprising a larger data payload than the downlink data packet.

Aspect 29: The method of any of aspects 17-28, where transmitting the wake-up signal includes: transmitting, via one or more indications in the wake-up signal, permission for the ambient communication device to communicate the data packet.

Aspect 30: A method for wireless communications at an ambient wireless device, comprising: transmitting, to a reader device, an uplink signal indicating a data packet available for communication with the reader device; transmitting a first set of data bits via a first portion of a data field of the data packet with the reader device; communicating a first resynchronization field of the data packet for adjusting a symbol timing alignment of the reader device, wherein the first resynchronization field occurs subsequent to the first portion of the data field; and communicating, based at least in part on the communication of the first resynchronization field, a second set of data bits via a second portion of the data field Aspect 31: A method for wireless communications at a reader device, comprising: receiving, from an ambient wireless device, an uplink signal indicating a data packet available for communication with the reader device; obtaining, based at least in part on a first clock synchronization, a first set of data bits via a first portion of a data field of the data packet; performing a first clock resynchronization using a first resynchronization field of the data packet to adjust a symbol timing alignment for communication with the ambient wireless device, wherein the first resynchronization field occurs subsequent to the first portion of the data field; and obtaining, based at least in part on the symbol timing alignment of the first clock resynchronization, a second set of data bits via a second portion of the data field.

Aspect 32: An ambient wireless device for wireless communications, comprising a processing system that includes processor circuitry and memory circuitry that stores code, the processing system configured to cause the ambient wireless device to perform of any of aspects 1-16.

Aspect 33: An ambient wireless device for wireless communications, comprising at least one means for performing a method of any of aspects 1-16.

Aspect 34: A non-transitory computer-readable medium storing code for wireless communications, the code comprising instructions executable by one or more processors to perform a method of any of aspects 1-16.

Aspect 35: A reader device for wireless communications, comprising a processing system that includes processor circuitry and memory circuitry that stores code, the processing system configured to cause the reader device to perform a method of any of aspects 17-29.

Aspect 36: A reader device for wireless communications, comprising at least one means for performing a method of any of aspects 17-29.

Aspect 37: A non-transitory computer-readable medium storing code for wireless communications, the code comprising instructions executable by one or more processors to perform a method of any of aspects 17-29.

Aspect 38: An ambient wireless device for wireless communications, comprising a processing system that includes processor circuitry and memory circuitry that stores code, the processing system configured to cause the ambient wireless device to perform the method of aspect 30.

Aspect 39: An ambient wireless device for wireless communications, comprising at least one means for performing the method of aspect 30.

Aspect 40: A non-transitory computer-readable medium storing code for wireless communications, the code comprising instructions executable by one or more processors to perform a method of aspect 30.

Aspect 41: A reader device for wireless communications, comprising a processing system that includes processor circuitry and memory circuitry that stores code, the processing system configured to cause the reader device to perform a method of aspect 31.

Aspect 42: A reader device for wireless communications, comprising at least one means for performing a method of aspect 31.

Aspect 43: A non-transitory computer-readable medium storing code for wireless communications, the code comprising instructions executable by one or more processors to perform a method of aspect 31.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. An ambient wireless device, comprising:

a processing system that includes processor circuitry and memory circuitry that stores code, the processing system configured to cause the ambient wireless device to:

receive, from a reader device, a downlink signal indicating a data packet available for communication with the ambient wireless device;

perform a first clock synchronization using a synchronization field of the data packet;

communicate, based at least in part on the first clock synchronization, a first set of data bits via a first portion of a data field of the data packet;

perform a first clock resynchronization using a first resynchronization field of the data packet to adjust a symbol timing alignment for communication with the ambient wireless device, wherein the first resynchronization field occurs subsequent to the first portion of the data field; and communicate, based at least in part on the symbol timing alignment of the first clock resynchronization, a second set of data bits via a second portion of the data field.

2. The ambient wireless device of claim 1, wherein the processing system is further configured to cause the ambient wireless device to:

communicate, based at least in part on the first clock resynchronization, one or more additional sets of data bits via one or more additional portions of the data field; and perform one or more additional clock resynchronizations using one or more additional resynchronization fields of the data packet subsequent to the second portion of the data field.

3. The ambient wireless device of claim 1, wherein the processing system is further configured to cause the ambient wireless device to:

perform a second clock resynchronization using a second resynchronization field occurring subsequent to the second portion of the data field, wherein the first resynchronization field and the second resynchronization field are separated by a quantity of data bits associated with a resynchronization field periodicity.

4. The ambient wireless device of claim 3, wherein the quantity of data bits associated with the resynchronization field periodicity is based at least in part on a data rate of the data packet.

5. The ambient wireless device of claim 3, wherein the quantity of data bits associated with the resynchronization field periodicity comprise one or more data octets.

6. The ambient wireless device of claim 1, wherein the first resynchronization field comprises a sequence of bits that is selected based at least in part on one or more autocorrelation properties of the sequence of bits.

7. The ambient wireless device of claim 6, wherein the sequence of bits has an autocorrelation that exceeds an autocorrelation threshold when a clock offset is less than an offset threshold, and the sequence of bits has an autocorrelation that is less than the autocorrelation threshold when the clock offset exceeds the offset threshold.

8. The ambient wireless device of claim 6, wherein the sequence of bits comprises a quantity of zeros and a quantity of ones, the quantity of zeros being equal to the quantity of ones.

9. The ambient wireless device of claim 6, wherein the sequence of bits comprises one or more sets of adjacent zeros, the one or more sets of adjacent zeros including a quantity of zeros that is less than or equal to a threshold quantity of zeros.

10. The ambient wireless device of claim 6, wherein the sequence of bits comprises at least one of [1, 0, 1, 0, 1, 0, 0, 1, 0, 0, 1, 1, 1, 1, 0, 0], or [1, 1, 0, 1, 1, 0, 0, 0, 0, 1, 1, 0, 1, 0, 1, 0], or [1, 1, 1, 0, 0, 0, 1, 0, 1, 0, 0, 1, 0, 0, 1, 1].

11. The ambient wireless device of claim 1, wherein the processing system is further configured to cause the ambient wireless device to:

communicate the data packet via one or more symbols, wherein each symbol of the one or more symbols comprises a two-microsecond symbol or a four-microsecond symbol.

12. The ambient wireless device of claim 11, wherein the data packet comprises a sequence of bits including a quantity of zeros and a quantity of ones, and the processing system is further configured to cause the ambient wireless device to:

perform on-off-keying modulation to map each zero of the quantity of zeros to an off symbol of the one or more symbols and each one of the quantity of ones to an on symbol of the one or more symbols.

13. The ambient wireless device of claim 11, wherein the first resynchronization field spans one or more two-microsecond symbols.

14. The ambient wireless device of claim 1, wherein the first resynchronization field is shorter in duration than the synchronization field.

15. The ambient wireless device of claim 1, wherein the data packet comprises an uplink data packet or a downlink data packet, the uplink data packet comprising a larger data payload than the downlink data packet.

16. The ambient wireless device of claim 1, wherein, to receive the downlink signal, the processing system is configured to cause the ambient wireless device to:

obtain, via one or more indications in the downlink signal, permission from the reader device to communicate the data packet.

17. A reader device, comprising:

a processing system that includes processor circuitry and memory circuitry that stores code, the processing system configured to cause the reader device to:

transmit, to an ambient communication device, a downlink signal indicating a data packet available for communication with the ambient communication device;

communicate a first set of data bits via a first portion of a data field of the data packet with the ambient communication device;

communicate a first resynchronization field of the data packet for adjusting a symbol timing alignment of the ambient communication device, wherein the first resynchronization field occurs subsequent to the first portion of the data field; and communicate, based at least in part on the communication of the first resynchronization field, a second set of data bits via a second portion of the data field.

18. The reader device of claim 17, wherein the processing system is further configured to cause the reader device to:

communicate, based at least in part on the communication of the second set of data bits, one or more additional sets of data bits via one or more additional portions of the data field; and communicate one or more additional resynchronization fields of the data packet subsequent to the second portion of the data field for adjusting the symbol timing alignment of the ambient communication device.

19. The reader device of claim 17, wherein the processing system is further configured to cause the reader device to:

communicate a second resynchronization field occurring subsequent to the second portion of the data field, wherein the first resynchronization field and the second resynchronization field are separated by a quantity of data bits associated with a resynchronization field periodicity.

20. The reader device of claim 19, wherein the quantity of data bits associated with the resynchronization field periodicity is based at least in part on a data rate of the data packet.

21. The reader device of claim 19, wherein the quantity of data bits associated with the resynchronization field periodicity comprise one or more data octets.

22. The reader device of claim 17, wherein the first resynchronization field comprises a sequence of bits that is selected based at least in part on one or more autocorrelation properties of the sequence of bits.

23. The reader device of claim 22, wherein the sequence of bits has an autocorrelation that exceeds an autocorrelation threshold when a clock offset is less than an offset threshold, and the sequence of bits has an autocorrelation that is less than the autocorrelation threshold when the clock offset exceeds the offset threshold.

24. The reader device of claim 22, wherein the sequence of bits comprises a quantity of zeros and a quantity of ones, the quantity of zeros being equal to the quantity of ones.

25. The reader device of claim 22, wherein the sequence of bits comprises one or more sets of adjacent zeros, the one or more sets of adjacent zeros including a quantity of zeros that is less than or equal to a threshold quantity of zeros.

26. The reader device of claim 22, wherein the sequence of bits comprises at least one of [1, 0, 1, 0, 1, 0, 0, 1, 0, 0, 1, 1, 1, 1, 0, 0], or [1, 1, 0, 1, 1, 0, 0, 0, 0, 1, 1, 0, 1, 0, 1, 0], or [1, 1, 1, 0, 0, 0, 1, 0, 1, 0, 0, 1, 0, 0, 1, 1].

27. The reader device of claim 17, wherein the first resynchronization field spans one or more two-microsecond symbols.

28. The reader device of claim 17, wherein the data packet comprises an uplink data packet or a downlink data packet, the uplink data packet comprising a larger data payload than the downlink data packet.

29. An ambient wireless device, comprising:

a processing system that includes processor circuitry and memory circuitry that stores code, the processing system configured to cause the ambient wireless device to:

transmit, to a reader device, an uplink signal indicating a data packet available for communication with the reader device;

transmit a first set of data bits via a first portion of a data field of the data packet with the reader device;

communicate a first resynchronization field of the data packet for adjusting a symbol timing alignment of the reader device, wherein the first resynchronization field occurs subsequent to the first portion of the data field; and communicate, based at least in part on the communication of the first resynchronization field, a second set of data bits via a second portion of the data field.

30. A reader device, comprising:

a processing system that includes processor circuitry and memory circuitry that stores code, the processing system configured to cause the reader device to:

receive, from an ambient wireless device, an uplink signal indicating a data packet available for communication with the reader device;

obtain, based at least in part on a first clock synchronization, a first set of data bits via a first portion of a data field of the data packet;

perform a first clock resynchronization using a first resynchronization field of the data packet to adjust a symbol timing alignment for communication with the ambient wireless device, wherein the first resynchronization field occurs subsequent to the first portion of the data field; and obtain, based at least in part on the symbol timing alignment of the first clock resynchronization, a second set of data bits via a second portion of the data field.

* * * * *